United States Patent
Behandish et al.

(10) Patent No.: US 11,507,054 B2
(45) Date of Patent: Nov. 22, 2022

(54) METHOD AND SYSTEM FOR HIERARCHICAL MULTI-SCALE PART DESIGN WITH THE AID OF A DIGITAL COMPUTER

(71) Applicant: Palo Alto Research Center Incorporated, Palo Alto, CA (US)

(72) Inventors: Morad Behandish, Mountain View, CA (US); Amir Mirzendehdel, Palo Alto, CA (US); Saigopal Nelaturi, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 967 days.

(21) Appl. No.: 16/236,949

(22) Filed: Dec. 31, 2018

(65) Prior Publication Data
US 2020/0209832 A1 Jul. 2, 2020

(51) Int. Cl.
| | |
|---|---|
| *G06F 30/23* | (2020.01) |
| *G05B 19/4099* | (2006.01) |
| *B33Y 50/00* | (2015.01) |
| *G06F 30/20* | (2020.01) |
| *G06F 111/04* | (2020.01) |

(Continued)

(52) U.S. Cl.
CPC .......... *G05B 19/4099* (2013.01); *B33Y 50/00* (2014.12); *G06F 30/20* (2020.01); *G06F 30/23* (2020.01); *G05B 2219/35012* (2013.01); *G05B 2219/49007* (2013.01); *G06F 2111/04* (2020.01); *G06F 2111/06* (2020.01); *G06F 2119/18* (2020.01)

(58) Field of Classification Search
CPC ...... G05B 19/4099; G05B 2219/35012; G05B 2219/49007; B33Y 50/00; G06F 30/20; G06F 30/23; G06F 2111/04; G06F 2119/18; G06F 2111/06
See application file for complete search history.

(56) References Cited

U.S. PATENT DOCUMENTS

| | | | | | |
|---|---|---|---|---|---|
| 5,870,308 | A | * | 2/1999 | Dangelo | ................. G06F 30/00 716/108 |
| 6,102,958 | A | * | 8/2000 | Meystel | ................. G06F 17/10 703/2 |

(Continued)

FOREIGN PATENT DOCUMENTS

WO 2013/091085 6/2013

OTHER PUBLICATIONS

K. Mo, H. Wang, Z. Cheng, Y. Li, "IRA Assisted MMC-based topology optimization method" 35 pages, Oct. 16, 2018. (Year: 2018).*

(Continued)

*Primary Examiner* — Kibrom K Gebresilassie
(74) *Attorney, Agent, or Firm* — Mueting Raasch Group

(57) ABSTRACT

The present disclosure is directed to a method and system for hierarchical multi-scale design with the aid of a digital computer. A hierarchical representation of a shape and material distribution is constructed which satisfies a top-level constraint at a top-level of representation. Properties for families of designs at each of the lower levels of representation that satisfy additional constraints link each of the lower levels of representation to at least a next higher level of the representation.

20 Claims, 21 Drawing Sheets

(51) Int. Cl.
    *G06F 119/18* (2020.01)
    *G06F 111/06* (2020.01)

(56) References Cited

U.S. PATENT DOCUMENTS

| | | | | |
|---|---|---|---|---|
| 7,219,048 | B1* | 5/2007 | Xu | G06F 30/327 |
| | | | | 703/19 |
| 7,640,527 | B1* | 12/2009 | Dorairaj | G06F 30/392 |
| | | | | 716/139 |
| 8,117,141 | B1* | 2/2012 | Srinivasa | G06F 30/00 |
| | | | | 706/14 |
| 8,595,662 | B1* | 11/2013 | Yu | G06F 30/39 |
| | | | | 716/110 |
| 10,846,453 | B1* | 11/2020 | Castle | G06N 20/00 |
| 11,157,672 | B1* | 10/2021 | Feldman | G06F 30/3323 |
| 2003/0135352 | A1* | 7/2003 | Carballo | G06Q 40/00 |
| | | | | 703/1 |
| 2003/0220716 | A1* | 11/2003 | Mydlowec | G16C 20/10 |
| | | | | 700/268 |
| 2005/0257178 | A1* | 11/2005 | Daems | G06F 30/30 |
| | | | | 716/132 |
| 2011/0169828 | A1* | 7/2011 | Pedersen | G06T 19/00 |
| | | | | 345/423 |
| 2012/0036491 | A1* | 2/2012 | Ramji | G06F 30/392 |
| | | | | 716/122 |
| 2014/0363481 | A1* | 12/2014 | Pasini | A61F 2/36 |
| | | | | 424/423 |
| 2015/0193557 | A1* | 7/2015 | Okuno | G06F 30/20 |
| | | | | 703/1 |
| 2017/0011143 | A1* | 1/2017 | Abramson | G06F 30/20 |
| 2017/0132349 | A1* | 5/2017 | Berry | G06F 30/398 |
| 2018/0239851 | A1* | 8/2018 | Ypma | G03F 9/7019 |
| 2019/0147116 | A1* | 5/2019 | Benjamin | G06Q 50/165 |
| | | | | 703/1 |
| 2019/0197448 | A1* | 6/2019 | Nelaturi | G06Q 10/067 |
| 2019/0369278 | A1* | 12/2019 | Zhang | G01V 99/005 |
| 2020/0134918 | A1* | 4/2020 | Wang | G06T 17/30 |
| 2021/0268483 | A1* | 9/2021 | Vardon | B01J 35/1061 |

OTHER PUBLICATIONS

J. Martinez, H. Song, J. Dumas, and S. Lefebvre, "Orthotropic K-nearest foams for additive manufacturing" Aug. 28, 2017, 13 pages. (Year: 2017).*
J. S. Sobieski, B.B. James, A.R. Dovi, "Structural Optimization by Multilevel Decomposition", pp. 1775-1788, 1985 (Year: 1985).*
A. Saxena, G. K. Anonthasuresh, "Topology Synthesis of Complaint Mechanisms for NonLinear Force-Deflection and Curved Path Specifications" pp. 33-42, ASME 2001 (Year: 2001).*
European Search Report from EP Application No. 19219930.5 dated Jun. 2, 2020, 21 pages.
Mo et al., "IRA Assisted MMC-Based Topology Optimization Method", Arxiv.org, Oct. 16, 2018, 35 pages.
Nelaturi et al., U.S. Appl. No. 15/858,520, filed Dec. 28, 2017.
Behandish et al., U.S. Appl. No. 15/858,677, filed Dec. 28, 2017.
Aage et al., "Giga-voxel computational morphogenesis for structural design", Nature 550, 7674, 2017, 14 pages.
Behandish et al., "Automated process planning for hybrid manufacturing", Computer-Aided Design, vol. 102, Sep. 2018, pp. 115-127.
Bendsoe et al., "Topology Optimization: Theory, Methods and Applications", Springer, 2004, 393 pages.
Bendsoe, "Optimal Shape Design as a Material Distribution Problem" Structural optimization 1, 1989, 193-202.
Bonet et al., "Nonlinear Continuum Mechanics for Finite Element Analysis", Cambridge University Press, 1997.
Boomsma et al., "Metal Foams as Compact High Performance Heat Exchangers", Mechanics of Materials 35 (12), 2003, 1161-1176.
Brandner et al., "Concepts and Realization of Microstructure Heat Exchangers for Enhanced Heat Transfer", Experimental Thermal and Fluid Science 30 (8), 2006, 801-809.

Churchill et al., "Fourier Series and Boundary Value Problems". vol. 1963. McGraw-Hill New York.
DiCarlo et al., "Solid and Physical Modeling with Chain Complexes", In Proceedings of the 2007 ACM Symposium on Solid and Physical Modeling ACM, 2007, 73-84.
Duster et al., "The finite cell method for three-dimensional problems of solid mechanics", Computer methods in applied mechanics and engineering 197, 45-48, 2008, 3768-3782.
Ferrer et al., "Vademecum-based approach to multi-scale topological material design", Advanced Modeling and Simulation in Engineering Sciences 3, 2016, 23.
Ferretti, "The Cell Method: An Overview on the Main Features", Curved and Layered Structures 2, 2015.
Fullwood et al., "Gradient-Based Microstructure Reconstructions from Distributions Using Fast Fourier Transforms", Materials Science and Engineering: A 494, 1-2, 2008, 68-72.
Ge et al., "Carbon Nanotube-Based Synthetic Gecko Tapes", Proceedings of the National Academy of Sciences 104, 26, 2007, 10792-10795.
Geim et al., "Microfabricated Adhesive Mimicking Gecko Foot-Hair", Nature Materials 2, 7, 2003, 461.
Gibson et al., "Cellular Solids: Structure and Properties", Cambridge University Press, 1999.
Hedges et al., "Stochastic level-set method for shape optimisation", J. Comput. Phys. 348, 2017, 82-107.
Hennessy et al., "Computer architecture: a quantitative approach", Elsevier, 2007.
Hillerborg et al., "Analysis of Crack Formation and Crack Growth in Concrete by Means of Fracture Mechanics and Finite Elements", Cement and Concrete Research 6, 1976, 773-781.
Hu et al., "Multiscale Phenomena in Microfluidics and Nanofluidics", Chemical Engineering Science 62, 13 (2007), 3443-3454.
Huang et al., "Evolutionary topology optimization of continuum structures: methods and applications" John Wiley & Sons, 2010.
Ioannidis et al., "On the Geometry and Topology of 3D Stochastic Porous Media". Journal of Colloid and Interface Science 229, 2000, 323-334.
Liu et al., "A Predictive Machine Learning Approach for Microstructure Optimization and Materials Design", Scientific Reports 5, 2015, 11551.
Liu et al., "Random Heterogeneous Materials via Texture Synthesis", Computational Materials Science 99, 2015, 177-189.
Martinez et al., "Procedural Voronoi Foams for Additive Manufacturing", ACM Transactions on Graphics (TOG) 35, 4, 2016, 13 pages.
Martinez et al., "Orthotropic K-Nearest Foams for Additive Manufacturing", ACM Transactions on Graphics (TOG) 36, 4, 2017, 13 pages.
Mecke, "Additivity, Convexity, and Beyond: Applications of Minkowski Functionals in Statistical Physics", In Statistical Physics and Spatial Statistics Springer, 111-184.
Meza et al., "Strong, Lightweight, and Recoverable Three-Dimensional Ceramic Nanolattices", Science 345, 6202, 2014, 1322-1326.
Meza et al., "Resilient 3D Hierarchical Architected Metamaterials", Proceedings of the National Academy of Sciences 112, 37, 2015, 11502-11507.
Mirzendehdel et al., "A Pareto-Optimal Approach to Multimaterial Topology Optimization", Journal of Mechanical Design 137, 10, 2015, 101701.
Museth et al., "VDB: High-Resolution Sparse Volumes with Dynamic Topology", ACM Transactions on Graphics (TOG) 32, 3 (2013), 22 pages.
Nocedal et al., "Conjugate gradient methods", Numerical optimization, 2006, 101-134.
Ohser et al., "3D Images of Materials Structures: Processing and Analysis" John Wiley & Sons, 2009.
Ostoja-Starzewski, "Microstructural Randomness and Scaling in Mechanics of Materials" Chapman and Hall/CRC, 2007, 7 pages.
Palmer et al., "Chain Models of Physical Behavior for Engineering Analysis and Design", Research in Engineering Design 5, 1993, 161-184.

(56) References Cited

OTHER PUBLICATIONS

Sigmund, "Materials with prescribed constitutive parameters: an inverse homogenization problem", International Journal of Solids and Structures 31, 17, 1994, 2313-2329.
Sigmund et al., "Topology optimization approaches", Structural and Multidisciplinary Optimization 48, 2013, 1031-1055.
Simpson et al., "Metamodels for computer-based engineering design: survey and recommendations", Engineering with computers 17, 2001, 129-150.
Sivapuram et al., "Simultaneous material and structural optimization by multiscale topology optimization", Structural and multidisciplinary optimization 54, 2016, 1267-1281.
Taber et al., "A Moment-Vector Approach to Interoperable Analysis", Computer-Aided Design 102, 2018, 139-147.
Thiagarajan et al., "Shape Aware Quadratures" J. Comput. Phys., 2018.
Torquato , "Statistical Description of Microstructures", Annual Review of Materials Research 32, 2002, 77-111.
Vogel, "Topological Characterization of Porous Media. In Morphology of Condensed Matter" Springer, 2002, 75-92.
Zhu et al., "Two-scale topology optimization with microstructures", ACM Transactions on Graphics (TOG) 36, 5, 2017, 17 pages.
Zienkiewicz, et al., "The finite element method", vol. 36. McGraw-hill London, 1977.

\* cited by examiner

METHOD AND SYSTEM FOR HIERARCHICAL MULTI-SCALE PART DESIGN WITH THE AID OF A DIGITAL COMPUTER

This invention was made with government support under contract number HR0011-17-2-0030 awarded by DARPA. The government has certain rights in the invention.

SUMMARY

The present disclosure is directed to a method and system for hierarchical multi-scale design with the aid of a digital computer. In one embodiment, a top-level design constraint and a design objective are defined for an object that is targeted for manufacturing via manufacturing instruments. The object boundary is divided into a number of first-level cells. Each cell being assigned one or more properties that collectively satisfy the top-level design constraint. For two or more levels of a hierarchy, beginning with the first-level cells as parent cells, each of the parent cells are divided into a plurality of child cells. The child cells of each parent cells each have child properties that collectively satisfy the one of more properties of the respective parent cells. The child properties within each of the child cells are optimized while still collectively satisfying the one of more properties of the respective parent cells. The levels are complete when a selected set of child cells represent a design suitable for tolerances of the manufacturing instrument and that satisfy the top-level design constraint. The selected set of child cells being used to define a manufacturable design of the object.

In another embodiment, at least one design criterion comprising at least one constraint is specified. A hierarchical representation of families of designs is constructed that satisfy the specified criteria at every level of the representation. The hierarchical representation includes one or more levels of representation wherein lower levels of representation provide more details about the designs than the higher levels of representation, thereby further restrict the design families. Families of designs at every level of the representation are synthesized, that satisfy the specified criteria as well as additional constraints that link the levels of the representation.

In another embodiment, a hierarchical representation of surrogate properties of shape and material distributions of a family of designs by a spatial cellular decomposition is synthesized with properties assigned to each cell at each level of the hierarchical representation. Starting from a top level of the hierarchical representation, properties at the top level are determined that satisfy constraints specified at the top level based on an analysis performed at the top level. For each level below the top level, a process is performed that involves further decomposing each cell at a given level into disjoint cells of the next level. Decisions on the surrogate properties assigned to the child cells are made based on an analysis performed at the given level subject to additional constraints that enforce the properties at the cell at the given level to remain consistent with the surrogate properties decided at the cell at the previous level.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures. The drawings are not necessarily to scale.

DETAILED DESCRIPTION

Figure 1:
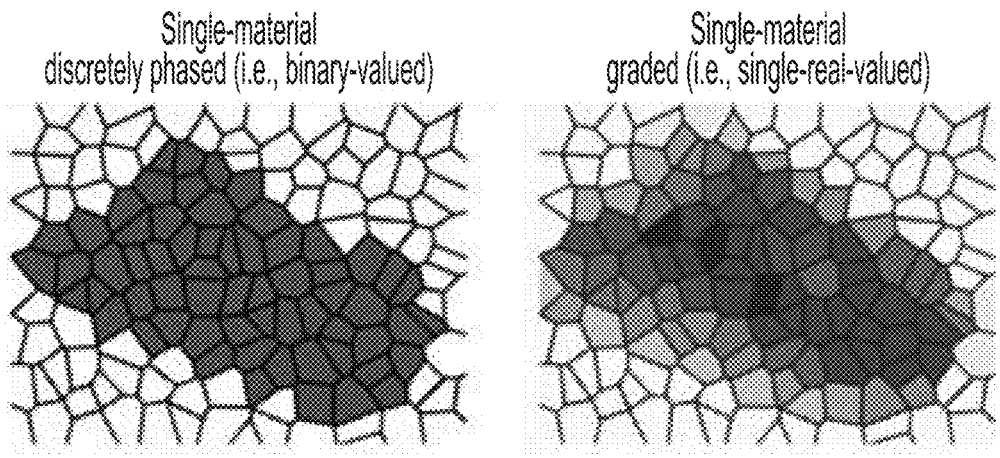
FIGS. 1 and 2 are schematic diagrams that illustrate examples of cellular representation schemes for representation of surrogate properties of designs according to example embodiments.

The present disclosure relates to designing of mechanical parts for multi-scale criteria. Modern parts are made with increasingly complex structures and multiple materials at high resolution using techniques such as additive manufacturing (AM). The design of such structures for desired functionality is challenging because of the diverse physical phenomena occurring at a range of size scales; for instance, from the microstructure behavior to the emerging bulk behavior at the macro-scale. Analyzing for all of these scales at once is impractical with the existing methods because of theoretical and computational limitations. The state-of-the-art methods tackle the problem by separating the scales and up-/down-scaling using theories of (forward and inverse) 'homogenization'. However, they are all limited by the assumptions on neighborhood size for averaging properties, separability of scales, ergodicity, periodicity, linearity, etc.

This disclosure describes systems and methods that provide flexibility in multi-scale organization and explores a larger design space with added functional versatility. These systems and methods can generate complex designs that are beyond the reach of compute-intensive high-resolution single-scale methods as well as multi-scale methods operating on restricted material architectures and homogenization assumptions.

The rapid growth in fabrication technology has enabled enormous structural complexity in functional parts, using additive, subtractive, or combined processes. High-resolution multi-material 3D printing techniques, among others, have enabled architecting materials at a level of detail and complexity that is multiple orders of magnitude finer than the part's overall size. The existing computational design tools are, however, unable to explore the immense design space implied by the ability to customize parts at such levels of detail and complexity spanning several length scales (e.g., from microns to meters). The overall performance of the part, on the other hand, depends on physical behavior that occurs at multiple scales, sometimes ranging from the nano-scale to macro-scale phenomena. Analyzing for all of these scales at once is not only impractical because of computational limitations, but also often meaningless. For example, topology optimization has been successful in designing parts for optimized structural deformation and compliance at the macro-scale, but the optimized design can fail due to stress concentrations and crack propagation that are not accounted for as they occur at the micro-scale.

High-performance computing (HPC) is rapidly growing more powerful and affordable. Compute-intensive graphical processing units (GPU) with thousands of processors are arriving at a cost point of a few cents per core, motivating a shift in computational paradigm towards simpler but more parallelizable data structures and algorithms. However, the linear growth of computing power at its peak (illustrated best by Moore's law) is overshadowed by the exponential growth of the design space complexity with improved manufacturing resolution. Synthesizing designs represented explicitly at full-resolution is simply intractable, not to mention a host of other computational problems such as numerical instabilities and convergence issues that appear in such attempts.

In addition to the computational barriers, it may not be necessary (or even desirable) to represent and analyze all details at the finest scale. Different physical phenomena and behavioral requirements are only meaningful at one observation scale or another, while others are so fundamental that are preserved across the scales. For instance, statistical fluctuations at the micro-scale of a loaded structure may not be relevant to the mean deformation or strain energy at the macro-scale. Hence, it makes sense to "homogenize" the relevant material properties over neighborhoods within the size scale of millimeters and perform finite element analysis (FEA) at the macro-scale, at which such neighborhoods are small enough discretizations, to design for optimal compliance.

However, stress concentrations at the tip of micro-cracks are not observed in the resulting bulk behavior obtained from macro-analysis, though they can have dire consequences that transcend the scales, e.g., total failure due to crack growth/propagation. In addition to introducing new failure modes, the small-scale phenomena can be exploited to improve the large-scale performance. Examples of the latter are using metal foams for heat exchanger design, micro-fluidics for lab-on-a-chip design, and micro-fabricated hairs for adhesive design. In order to exploit the freedom in choosing complex forms fit into small spatial neighborhoods as well as to avoid the nontrivial failure modes that come with such complexities, there is a need for effective multi-scale analysis and design tools.

Although a bottom-up approach to design using a detailed analysis at the finest level of detail and propagating the effects up to the macro-scale is conceivable, it is computationally intractable and (sometimes) numerically unreliable. A more practical top-down approach to design requires a hierarchical representation that implicitly describes the part by its physically-relevant properties at different size scales. At each size scale, the part is designed to satisfy (and possibly optimize) the behavioral requirements that are relevant to the physical laws governing that scale. As with every multi-faceted representation, the challenge is to maintain a consistent representation of the shape and material distribution, so that distinct views at different scales are ultimately representing an equivalent physical part or part families to be manufactured at one scale or another.

Methods and systems described herein represent and design parts hierarchically at a finite number of size scales, generally using a top-down design process. At every scale, an inverse problem is solved by choosing surrogate properties of shape and material distribution, at a level of granularity defined by the size scale, such that design requirements at that level are satisfied. This process involves deciding (and possibly optimizing) bulk properties at the coarsest scale first and postponing decision-making pertaining to higher-order details to the design process at finer scales. The same design process is repeated recursively, optimizing objective functions and enforcing constraints both of which are scale-dependent behavioral requirements.

At every passage from one scale to the next, the process enforces invariance of fundamental properties that are scale-agnostic. This is enforced by passing them to the next scale as an additional set of constraints so that subsequent decisions do not affect the feasibility and optimality of prior decisions at the coarser scales. The challenge in realizing this method is in the proper choice of invariant properties, and in re-architecting analysis tools (forward problem solvers) in such a way that they can reason about macro-behavior from a knowledge of macro-shape and material properties, before arriving at a decision with regards to finer details or their precise realization.

Some preliminary concepts involved in these methods are those of forward and inverse problems. To systematically synthesize designs to fulfill a set of performance requirements by searching the design space (the inverse problem), one needs the ability to analyze a given design to compute its behavior (the forward problem), check it against the required performance criteria, and decide on the next move in the design space if the requirements are not met. This iterative paradigm is fundamental to most design methods where a closed-form solution for the inverse problem does not exist. For physics-based performance requirements, the forward problem is typically solved by numerical methods such as finite element method (FEM), finite difference method (FDM), discrete element method (DEM), cell method, and others. The inverse problem is solved by iterating over candidate designs and repeating the analysis, steered by a variety of techniques such as gradient-descent optimization, stochastic/evolutionary optimization, machine learning, and so on. Unlike forward problems, the solution to the inverse problems is not unique, leaving one with additional flexibilities with regards to design decisions. Among the most popular synthesis paradigms are shape and topology optimization (TO). TO seeks to find the shape (geometry and/or topology) and material distribution(s) in a given domain that lead to optimized performance for a given cost (e.g., mass) under specified boundary conditions.

Another preliminary concept is that of spatial discretization schemes. Most existing computational tools for physical analysis/synthesis rely on a discretization of the three-dimensional (3D) space into sufficiently small elements (e.g., 'cells'). The cells can be thought of as the atomic design features, and their size determines the granularity of the shape and material representation as well as physical simulation. The most popular choice are equally-sized coordinate axis-aligned cubic cells (e.g., voxels) arranged along a uniform 3D grid. However, arbitrary cellular complexes are possible in principle.

Each cell holds one or more design variables—also called decision variables-assigned to the entirety of the cell, meaning that there is no variations throughout a single cell. Thus, one needs to choose smaller cells (finer granularity) to represent spatial fields in discrete form. The local shape and material properties are deduced from the design variables; for instance, a binary variable (1 or 0) assigned to a cell can be used to indicate whether that cell is full or empty, respectively, while a fraction in the range [0, 1] can be used to specify the cell's volume occupancy ratio (e.g., 0.35 means 35% full). The number of possible fields that can be represented as such is (at least) exponential in the number of cells. Similarly, one or more variables-generally scalars, vectors, or tensors—can be assigned to specify each cell's material properties such as coefficients of physical constitutive laws (e.g., elasticity, heat/electrical conductivity, and so on). As such, the shape and material distributions are described by a (discretized) field over the 3D space. For purposes of the following discussion, the term "field" is meant to describe a discretized field also known as a discrete form.

Searching the design space becomes quickly impractical as the set of decision variables grows with more choices of base materials (e.g., material phases) and their gradation/heterogeneity; higher degrees of freedom that capture material anisotropy (e.g., 21 independent variables needed to represent the most general elasticity tensor at every cell); and more fine-grained discretization (e.g., more cells) with improved AM resolution; all of which enable more design flexibility to customize multi-physical behavior (e.g., coupled thermo-elasticity).

One solution to the complexity problem is to conceive a hierarchical representation of the design at multiple size scales, such that the design space exploration is broken into manageable steps. The top level is a coarse-grained view of the design with relatively large cells and a small number of representative (e.g., bulk) material properties assigned to them as decision variables. Each cell can be further decomposed into smaller cells with a more detailed redistribution of material properties at the next level to obtain a more fine-grained view of the design. The scope of decision making is limited at the finer-grained levels, based on the already-fixed decisions at the coarser-grained levels, so as to reduce the degrees of freedom and fold the computational complexity.

This method uses a fundamental assumption that is often implicit: to decide/optimize the coarse-grained decision variables, one needs the ability to (at least partially) predict the resulting coarse-grained performance in spite of the incomplete information pertaining to fine-grained details. Thus at each level, it is assumed that an analysis tool can predict some "effective" behavior from a knowledge of some "effective" shape and material properties, using a formulation of physical behavior that applies to that level's size scale. The finer-grained details that will prevail in subsequent design refinement are assumed to be irrelevant to the predictions happening at the coarser-grained levels, hence can be ignored when making the coarser-grained design decisions.

Generally, there are two ways to generate complex designs that span multiple length scales in representation detail. One of these is high-resolution synthesis at-scale. In such methods, the information is decided at the finest level of granularity and is passed bottom-up to obtain bulk properties and behavior at the coarser-grained levels; for instance, by averaging/homogenization ("up-scaling"). Given sufficient computational resources, one can use the same level of granularity for representation, analysis, and synthesis at the finest-grained scale. Even with today's technology, this approach to automated design optimization requires expensive high-performance computing (HPC) infrastructure that is only accessible to a few researchers and engineers. Moreover, the suggested optimized designs are far from the final form that could be manufactured and would function in practice. This is due to numerical inaccuracy and noise that will inevitably exist when solving such large-scale systems of equations (e.g., for FEA).

A level-set TO has been developed that relies on assembly-free solution of the FEA on high-resolution sparse voxelizations (based on OpenVDB data structure). The assembly-free approach improves the computational performance of the FEA, which is the most intensive step, repeated many times in the inverse problem solving loop. The approach can handle a large number of voxels with reliable numerical precision in reasonable time on affordable computers. However, increasing the resolution to capture a wider span of length scales would require longer CPU-hours if the FEA elements are selected to align with the cells at the same resolution or granularity. Alternative approaches based on separating representation (of shape and material layout) and analysis resolutions have gained popularity over the past few years, because they enable reducing FEA degrees of freedom to manage computational complexity while retaining (at least some of) the design freedom offered by high-resolution representation of the shape and material layout.

Another way to generate complex designs that span multiple length scales is a top-down approach to multi-scale hierarchical synthesis. Homogenization theory is a tool that provides the necessary conditions for the scales to be separable by means of computing "effective" material properties over neighborhoods that sufficiently characterize the neighborhood's overall (e.g., bulk) behavior via constitutive relationships at the macro-scale. The premise is that these effective properties can be obtained by independently studying the shape and material distribution at the micro- and meso-scales.

A two-scale design process is thus conceptualized in which the design is first optimized at the macro-scale. In density-based TO methods, the decision variables at the macroscale are 'homogenized' material properties, e.g., coefficients of constitutive relations that relate the average physical quantities as measured by an observer at macroscale. Next, a detailed structure that respects the desired homogenized property is synthesized at the micro-/meso-scale. This process is often called 'inverse homogenization' or (as it is called in a more general context) 'realization' of the macro-properties by mico-distributions. Some challenges to these methods are that their validity relies on the assumption of a substantial separation of scales, so that the micro-geometric details do not affect the macro-properties, e.g., the homogenized properties are sufficient information to perform a coarse-grained analysis directly on the coarse-grained model of the shape and material layout. These methods rely on a rapid mapping from bulk shape characteristics (e.g., volume fraction) to bulk physical properties (e.g., Young's modulus) that is often obtained by offline computational experiments under restrictive assumptions. The boundary conditions, connectivity/continuity, and/or smooth transition from one cell to another can be difficult to guarantee, leading to use further simplifying heuristics and assumptions such as periodic cells, closed cells, predefined boundaries, and so on to come up with valid and reasonable designs in a much more restricted design space.

There are two common scenarios in which classical homogenization comes with reliable guarantees. First when the design is restricted to periodic cells with repeating boundary conditions, in which case the cells are called representative/repeating volume elements (RVE). A second scenario is when the cells are aperiodic (e.g., open-cell foams) but in such a way that their "effective" macro-properties can be obtained as the average—g over a meso-scale neighborhood—of different but statistically equivalent microstructures found in that neighborhood, in which case the cells are called statistical volume elements (SVE). In other words, the fluctuations of shape and material properties as well as those of the resulting physical behavior are assumed to average out.

The former scenario normally requires regular structures aligned with an orthogonal Cartesian grid along which the RVEs are tiled with no (or gentle) gradation to enable making independent design decisions at the microstructure level regardless of neighboring cells. If the microstructure and its boundary conditions change from one cell to another, the analysis at the macro-scale is only valid up to some approximation that depends on the size of the RVEs. The latter scenario requires the existence of a meso-scale that separate the macro- and micro-scales-often described in terms of their characteristic lengths as $L_{micro} \ll L_{meso} \ll L_{macro}$. In both cases the substantial separation of scales—e.g., a few orders of magnitude difference in cell size—is a necessity for any rigorous guarantees to hold. This significantly restricts the design regimes that this two-scale approach can produce with reliable analysis in the loop.

One approach to synthesizing structures at finer levels of details is to generate a library of microstructures offline and match the homogenized properties (decided at the macro-scale synthesis) with those of the microstructure; for instance, using a least-squared error minimization approach. In these methods, the range of realizable bulk properties by the elements in the library are imposed as a constraint on the optimization problem at the macro-scale. Microstructure realization for given bulk properties can also be addressed by machine learning. An alternative approach is to simultaneously optimize the tightly coupled macro- and meso-scale structures by local linearization of objective functions and constraints for the micro-scale around the optimized variables at the macro-scales, which is a common recipe to develop multi-scale TO algorithms.

The number of variables that represent the homogenized behavior of a single cell at macro-scale can be large even for a single-physics problem. For example, the elasticity tensor that represents a linear relationship between Cauchy stress and strain tensors using a small deformations model (averaged or interpolated over the cell) has 21 independent decision variables. This leads to high-dimensional material property spaces that are difficult to precompute by sampling, regression, or machine learning for inverse homogenization mapping. To make the problem manageable, it is common to restrict the material structure to orthotropic (12 variables), cubic (3 variable), or most commonly isotropic (2 variables: Young's modulus and Poisson's ratio), missing out potential advantages of a fully anisotropic design.

A notable challenge with homogenization-based methods is to guarantee that neighboring cells connect properly. This is often achieved by restricting the shapes of microstructures or their boundaries, applying heuristics to choose them properly from a restricted set of options, or ad hoc "gluing" solutions that further restrict the class of attainable designs.

The systems and methods described herein enable multi-scale synthesis even when the scales are not substantially separated in size, and without appealing to any additional assumptions on standalone correlations between bulk shape and material properties (e.g., volume fraction) and bulk physical response (e.g., average elasticity). Rather, the methods utilize a full analysis that depends on integral properties over the cells. The methods provide flexibility to select the number of decision variables; namely, "surrogate" properties (e.g., integral properties) that partially express the shape and material content of a cell as well as the cell size at any level. Moreover, the methods do not rely on precomputed libraries of linearized/homogenized behavior that conceptualize meso-scale material neighborhoods as points (or infinitesimal neighborhoods) from the macro-scale viewpoint. Rather, they run full analyses on-the-fly by feeding a property-based solver (e.g., a modified form of FEA) on the said surrogate properties. Since larger cells require more information content for high-fidelity analysis, these methods enable trading cell size with number of retained properties per cell.

By adopting a "declarative" and property-oriented, rather than shape-oriented, hierarchical representation throughout the design process, these methods do not need to deal with boundary connections at all. The geometric realization of the hierarchically synthesized properties will be postponed to as late as possible in the design stage (akin to 'lazy computation' in computer science lexicon). The realization can be postponed even until a manufacturing process is specified, which restricts the space of realizable shape and material layouts depending on the process parameters.

Hereafter, "shape and material distribution/layout" is used in a purely geometric sense independent of particular physics. It should not be confused with material properties that are pertinent to specific physical constitutive laws. For instance, an ideal representation of a single-scale solid f made of a single homogeneous and isotropic material can be given by a binary-valued 'indicator' or 'characteristic' function/field which is a function that assigns every 3D point with a value of 0 ("empty") or 1 ("full"), such that the shape of the part is implicitly defined by the set of all points at which this function is nonzero. An extension of this is to model material gradation at macro-scale by a real-valued density field; that is, a function that assigns every 3D point with a greyscale value (including partially empty or partially full) that can be interpreted statistically; for instance, in terms of its microstructure's porosity or average volume fraction.

The following embodiments utilize a discrete representation of shape and material distribution fields. Intuitively, the 3D space is discretized into a finite number of cells to which the binary-valued indicator or real-valued density (e.g., occupied volume fraction) function values are assigned as-a-whole. To accommodate multiple material phases that collectively form the multi-material part, tuples like ($p_{\Omega 1}$, $p_{\Omega 2}$, ..., $p_{\Omega n}$) can be assigned one or more of the n base materials in different proportions to every cell in 3D space.

For example, given three 'base materials' A, B, and C with known properties in pure medium, a 3-tuple (0.35, 0.43, 0.12) assigned to a cell indicates can be interpreted that the cell's volume is occupied with 35% material-A, 43% material-B, 12% material-C, and the 10% remainder is empty, without making any assertion about the precise geometry of the composite microstructure. In a sense, such a representation supplies complete information to specify the design from the viewpoint of an observer at the macro-scale, where one does not have to know any additional details about the microstructure to perform coarse physical analysis. However, this representation does not specify sufficient information to lock down the structure at the meso-/micro-scale.

The methods described herein utilize a multi-scale generalization of informational completeness. A representation of shape and material distribution is said to be "complete" at a given level/scale if it is sufficient to infer functional/behavioral aspects that are relevant to that size scale. This relies on having access to an analysis tool that can use this information to reason about behavioral properties even when the finer details about the shape and material distribution is left undecided or uncertain.

Figure 2:
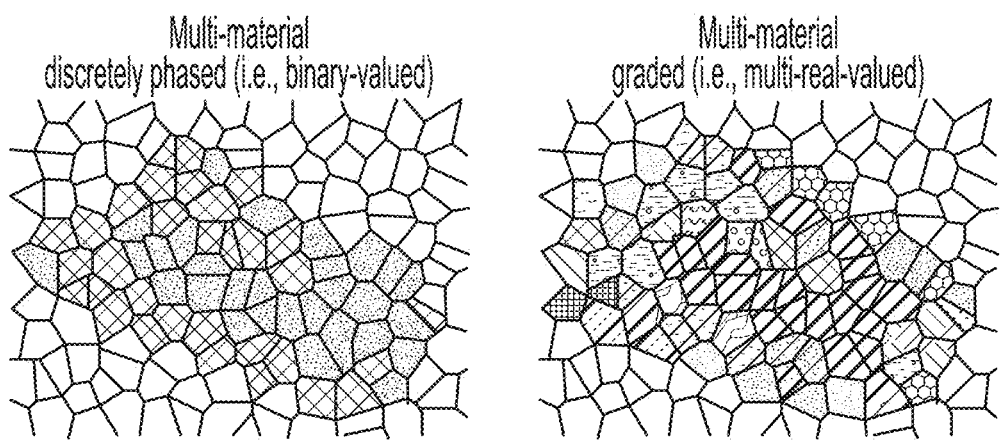

In FIGS. 1 and 2, diagrams schematically illustrate single- and multi-material representation schemes for unmixed (discretely phased) and mixed (spatially graded) materials at one particular scale (e.g., macro-scale) in 2D used in a method according to an example embodiment. The 2-cells (planar faces) bounded by 1-cells (planar curves) illustrated for the planar shape and material layout in FIGS. 1 and 2 generalize to 3-cells (spatial volumes) bounded by 2-cells (spatial surfaces) in 3D, and are sketched in 2D here for ease of illustration. Note that there is no limit on the number of base materials or the shape of cells, but most real-world examples can be solved by a few base materials and uniform polyhedral cells, often further simplified to coordinate axis-aligned cubic voxels.

To achieve a hierarchical multi-scale representation, assume K>1 to be a user-defined integer that specifies the number of levels (called 'height') of the hierarchy. For k=1, 2, . . . , K the $k^{th}$ level is a discrete form representation of shape and material distribution at that level/scale, in a similar fashion as a single-scale representation of FIGS. 1 and 2. For every cell $c_k$ at the $k^{th}$ level, its diameter (the largest distance between any pair of points in the cell) dia($c_k$) is bounded as $L_k(1-E_k) \le dia(c_k) \le L_k(1+E_k)$ where $L_k$, $E_k > 0$ are constants. These bounds define the size "scale" at which the observer measures shape and material properties at that level. In a sense, these bounds specify the neighborhood size over which these measurements are meaningful for the physical phenomena at that level.

The $1^{st}$ level is the coarsest, capturing the least detail but offering the simplest representation with fewest decision variables for design. It is also the scale at which design requirements (e.g., boundary conditions) are specified. The $K^{th}$ level is the finest but most complex, typically confined to smaller regions of interest. The premise is that designing for the entire structure at this level is computationally prohibitive, which is why a divide-and-conquer approach is used and the attention is confined to a subset of the (often more critical) cells that may require further subdivision into finer-grained sub-cells.

A cell at the $k^{th}$ level (the 'parent') can be decomposed into a sub-complex of several smaller disjoint cells at the $(k+1)^{th}$ level (the 'children'). Hence, the cell complex is constantly refined into more fine-grained elements at subsequent levels. As with the single-scale complex, every cell at every level carries a finite number of design variables for the entire cell. These are most commonly integral properties of the material distribution within the cell. The observer at the $k^{th}$ level does not see anything more fine-grained with respect to the distribution within the cell. These details will only prevail when looking at the $(k+1)^{th}$ scale and so forth. Every design variable at the $k^{th}$ level is interpreted as the parameters of a design constraint that the variables at the $(k+1)^{th}$ level must satisfy. This is a feature of top-down design and will be explained more shortly.

Figure 3:
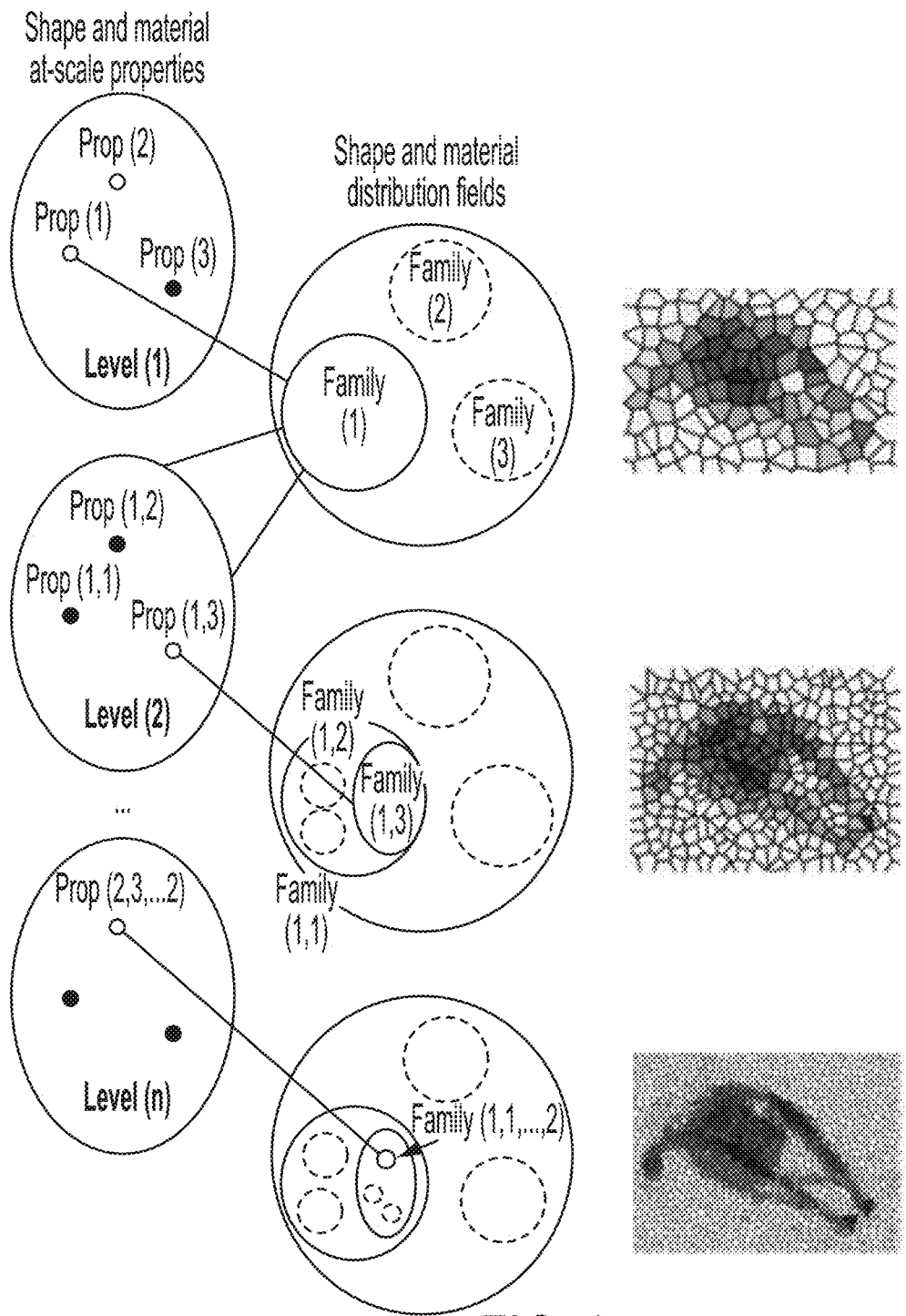
FIG. 3 is a diagram showing a hierarchical representation of multi-scale design classes in a declarative form and the down-scaling process according to an example embodiment.

At every level, the design variables are to be viewed as a "declarative" representation of the design at the next level. In other words, the $k^{th}$ level declares a set of constraints that define a family of designs which satisfy them. At the $(k+1)^{th}$ level, the more fine-grained representation narrows the family down to a smaller subset of the design space. As illustrated in FIG. 3, this process continues until the family is tightly constrained enough to implicitly represent a class of interchangeable parts with narrow variations (e.g., interpreted as tolerances), which can be sent for manufacturing.

This method models a "bottom-less" representation of information that never arrives at a single-point design, but keeps narrowing down design spaces/families until they are close enough to a point design for manufacturing. Since the constraints declared by a given parent cell are satisfied by its children, there is a partial ordering of these design families in terms of containment as one keeps refining them. The hierarchical representation remains sparse, since there is no need to explicitly specify constraints on grand-children, grand-grand-children, and so forth. They are automatically satisfied due to the transitivity of the constraint relationships. This is schematically illustrated in the diagram of FIG. 3.

The diagram in FIG. 3 is an abstract view of a hierarchical "declarative" representation of a multi-scale design. At each level, the design is constrained by a set of properties that implicitly define a family of shape and material distribution fields. Passing from one scale to the next amounts to further constraining the family by adding more properties/constraints. This continues until the family is restricted enough to fall within part interchangeability bounds for manufacturing.

The constraints imposed by the parent cells on their children include (but need not be limited to) subdivision invariance of the parent cell's properties when they are distributed among the children. For example, if a number of density values, collected in a n-tuple $\rho_1(c_k)$, $\rho_2(c_k)$, . . . $\rho_{n1}(c_k)$) is assigned to a given cell $c_k$ at the $k^{th}$ level to specify volume fractions occupied by each of the available n≥1 base materials inside that cell, the tuples assigned to that cell's children $c_{k+1}*$ at the $(k+1)^{th}$ level (collectively denoted by the set of cells ch($c_k$)) are constrained by a number equalities that indicate the total volume assigned to the union of children has to be the same as the total volume assigned to the parent. In other words, the hierarchical representation is self-consistent across the scales. This is described by Equation (1) below.

$$\rho_i(c_k) = \Sigma_{c_{k+1}* \in ch(c_k)} \rho_i(c_{k+1}*), \text{ for } i=1,2,\ldots,n. \qquad (1)$$

Homogenization theory attempts to reformulate the governing equations of physical behavior (e.g., ordinary/partial differential equations) in terms of the statistical average over a given neighborhood that is small enough for this averaging to retain the key aspects of bulk physical behavior. Therefore, one can give a sufficiently detailed (for the purpose of physical analysis) representation of the shape and material layout in terms of the integral properties of the shape and material distribution restricted to a cell $c_k$ at the $k^{th}$ level. For example, the volume fraction of each material phase within a given cell in a FEQ mesh is often sufficient to infer physical properties for FEA to produce reasonably accurate results if the mesh is fine enough. For coarser cells, accurate computation of integrals for FEA (e.g., to assemble stiffness matrices or enforce Neumann boundary conditions) requires retaining higher-order integral properties of each cell than just volume fraction. Similarly, fluid flow or heat transfer problems are often homogenized in terms of porosity, which is computed similarly to volume fraction. For more accurate homogenization and upscaling to larger cells, higher-order properties (e.g., tortuosity) are used.

The precise shape and material distribution "field" is not known at any particular scale, but more information about its integral properties (e.g., statistical average) are discovered as one goes down the hierarchical representation. At the lowest level with the finest-grained decomposition of cells, one gets as close as needed to the continuous field (the "ground truth"). However, one will never quite arrive at the true field values that change from every point to the next, which is arguably an idealization in the limit of infinitely fine-grained cells.

Homogenization provides adequate approximation of the behavior from a knowledge of average shape and material distribution alone when each cell$_k$ is broken into many smaller child cells. The hierarchy is described by a large branching factor (number of children) and significant separation of length scales <<hence $L_{k+1}/L_k$<<1 where $L_k$ is the characteristic length at the $k^{th}$ level, defined earlier. The size of cells at the $(k+1)^{th}$ level need to be small enough from the viewpoint of an observer at the $k^{th}$ level for the average to be sufficient information for statistically reliable physical analysis. Our method can be viewed as a generalization of the classical (forward and inverse) homogenization, in which we use higher-order integral properties than basic average properties.

In order to allow more flexibility in the branching factor of the hierarchical decomposition and moderate separation of length scales, the information content of each cell can be described with more than a single variable such as statistical average of the amount of each material. To this end, the information content of each cell $c_k$ is represented with a vector of properties per each base material. For example, given n base materials and m properties per material phase, we have an (n×m) matrix of properties per cell as shown in Equation (2) below.

$$\mu(c_k) := \begin{pmatrix} \mu_1(c_k) \\ \mu_2(c_k) \\ \vdots \\ \mu_n(c_k) \end{pmatrix}^T = \begin{pmatrix} \mu_1^1(c_k) & \mu_2^1(c_k) & \cdots & \mu_n^1(c_k) \\ \mu_1^2(c_k) & \mu_2^2(c_k) & \cdots & \mu_n^2(c_k) \\ \vdots & \vdots & \ddots & \vdots \\ \mu_1^m(c_k) & \mu_2^m(c_k) & \cdots & \mu_n^m(c_k) \end{pmatrix} \quad (2)$$

For the special case with m=1, i.e., when there is only one degree of freedom per material phase per cell, the most viable integral property is the total/average amount of that material (absolute or relative) in the cell. This property takes various forms and can manifest as volume fraction, average density, average porosity, statistical mean (expected value) in the presence of uncertainty, among others. If m>1, i.e., more than one property are used per base material per cell as decision variables, there are different ways in which the vectors $\mu_i(c_k)$ can be chosen. Moreover, if these properties are chosen in such a way that they exhibit certain useful qualities such as additivity, continuity, completeness, convergence, and behavioral relevance, these qualities are exploited for multi-scale design.

Additivity is considered first. In order to connect the variables across the scales by parent-child relationships, additivity is retained as in Equation (3) below, which is a generalization of Equation (1) through component-wise addition of $\mu_i(c_{k+1}^*) = (\mu_i^1(c_{k+1}^*), \mu_i^2(c_{k+1}^*), \ldots, \mu_i^m(c_{k+1}^*))$.

As before, this can be interpreted as an equality constraint imposed by the parent cell on its children for top-down design.

$$\mu_i(c_k) = \sum_{c_{k+1}^* \in ch(c_k)} \mu_i(c_{k+1}^*), \text{ for } i = 1, 2, \ldots, n. \quad (3)$$

As to continuity, the properties change continuously with the actual shape and material distribution field. For example, a small geometric or topological change in the $i^{th}$ base material layout within $c_k$ would lead to a small change in $\mu_i(c_k)$ according to some metric in the shape and material domain. As to completeness, the finite sequence of properties $\mu_i(c_k) = (\mu_i^1(c_k), \mu_i^2(c_k), \ldots, \mu_i^m(c_k))$ is assumed to be the first m≥1 terms of a (potentially infinite) sequence of properties that completely describe the $i^{th}$ base material's layout within $c_k$. As to convergence, the design variants within the family of designs that satisfy the first m≥1 properties— interpreted as constraints in the next (finer-grained) level— differ only with respect to the unknown truncated terms ($\mu_i^{m+1}(c_k), \mu_i^{m+2}(c_k), \ldots$). All of the design variants lie within a bounded design subspace, with respect to some metric (e.g., Hausdorff distance). The space shrinks to a single-point design as m→∞. Finally, for behavioral relevance, the first m≥1 properties provide sufficient information to collectively reason about physical performance of the design variants within the constrained family, with respect to the physical phenomena that occur at the $k^{th}$ size scale as illustrated in FIG. 3. In other words, access to a computational analysis tool is assumed that can map these geometric properties to reliable physical properties, without a knowledge of more fine-grained details at the $(k+1)^{th}$ level.

The last condition is provides the ability to conduct a one-way top-down design for behavioral requirements, such that design within the constrained family in the $(k+1)^{th}$ level does not affect the decisions already made in the $k^{th}$ level. This will be elaborated below by revisiting computational workflows for physical analysis in single- and multi-scale problems.

In this section, the forward and inverse problems at a single scale are discussed. To evaluate the physical performance of a given part represented at a given scale, one typically solves a boundary value problem (BVP) using a numerical method such as finite difference method (FDM), finite element method (FEM), finite volume method (FVM), cell method, etc. These methods underlie many of the common numerical analysis and synthesis tools such as structural analysis (using FEA/FEM), computational fluid dynamics (CFD), shape and topology optimization, and their many variations.

Figure 4:
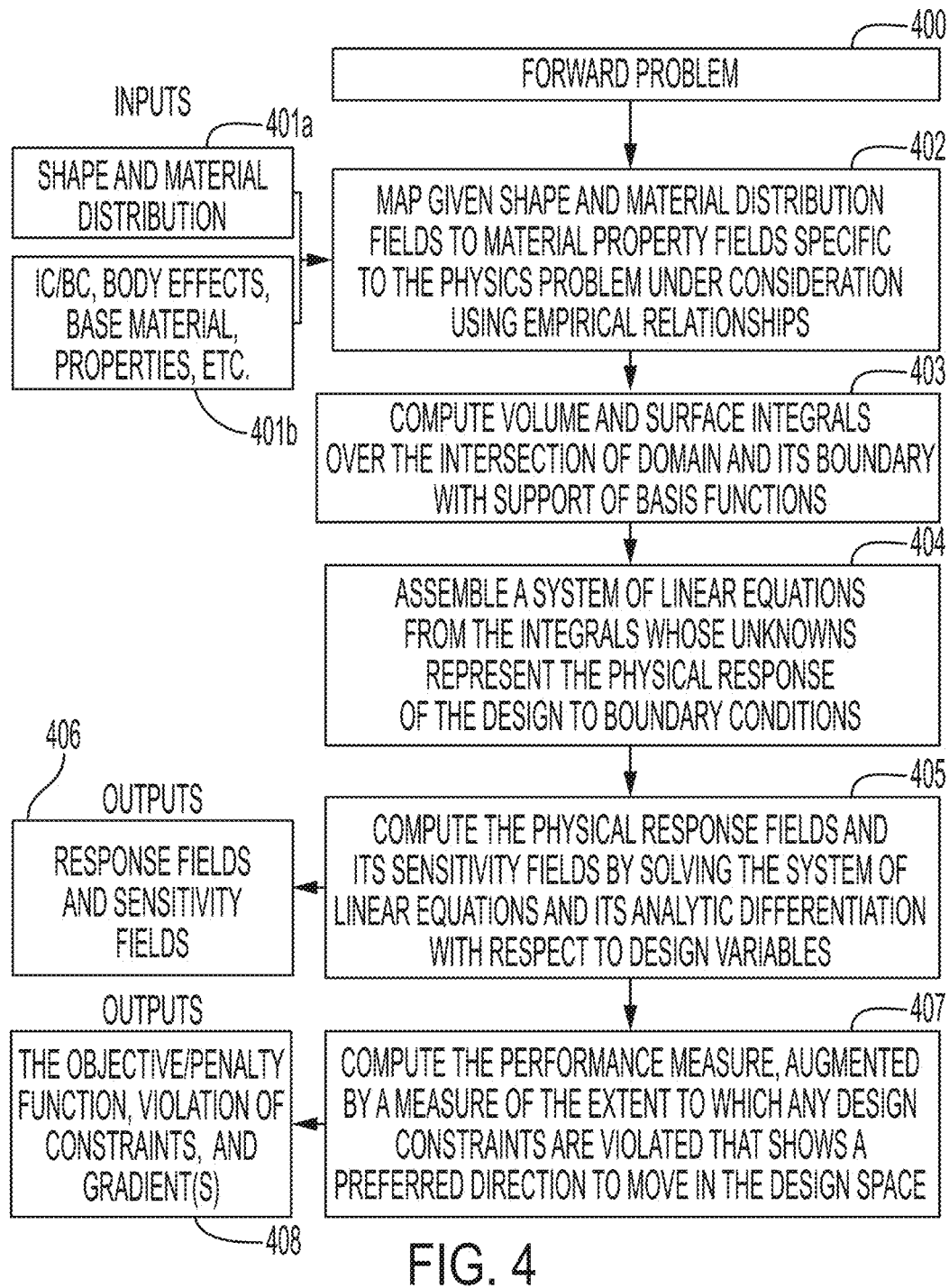
FIGS. 4 and 5 are flowcharts showing a forward and inverse problem solution according to example embodiments.

The solution field (e.g., displacement, temperature, etc.) characterizes the response of the design to initial/boundary conditions (IC/BC), body forces, or other stimuli, and is represented by a linear combination of simple basis functions in a vector space of functions (e.g., Hilbert space) that covers all possible solution fields at an appropriate level of granularity. To find the solution(s) that admit the BCs (among other potential constraints) the coefficients of this combination are obtained by solving a discretized form of the BVP; for instance, by minimizing a functional determined by the weak form of the BVP when using FEA/FEM. The computational workflow for solving the forward problem 400 can be conceptualized at a high level as a set of steps as shown in the flowchart of FIG. 4 according to an example embodiment.

Inputs 401*a* to the procedure include shape and material distribution fields (represented in a discrete form). Inputs 401*b* also include IC/BC, body effects, base material properties (for a finite number of available materials), and other FEA parameters. If there is homogenization involved, the given shape and material distribution field (geometric information) is mapped 402 to a material property field specific to the physics problem under consideration (e.g., stiffness, conductivity, etc.) using empirical relationships. For example, the relative volume fractions occupied by each of the base materials within each cell are used to infer an "effective" stiffness or conductivity for the entire composite cell. A number of surface and volume integrals are computed 403 over the domain and its boundary as part of the standard FEA. The integrands are typically linear or algebraic combinations of material property fields obtained in 402, BCs, and FEA basis functions.

A system of linear equations is assembled 404 from the integrals computed in 403 whose unknowns represent the physical response of the design to IC/BC, body forces, and other stimuli. The physical response fields and (if needed) their sensitivity fields are computed 405 by solving the system of linear equations and its differentiation with respect to design variables. Outputs 406 of this computation 405 include the response fields (e.g., displacement, temperature, etc.) expressed as a linear combination of FEA basis functions. The outputs 406 may also include the sensitivity fields (e.g., geometric or topological sensitivities) expressed as a linear combination of FEA basis functions.

If the results of the analysis are used to solve an inverse problem—e.g., to design the shape and material fields in such a way that the response fields satisfy certain performance criteria—the performance measures (e.g., objective function(s)) are computed 407, augmented by a measure of the extent to which any design constraints are violated (e.g., penalty function(s)) and gradient-like quantities that show a preferred direction to move in the design space. Outputs 408 of this computation 407 include the objective/penalty function(s) and their gradient(s).

Figure 5:
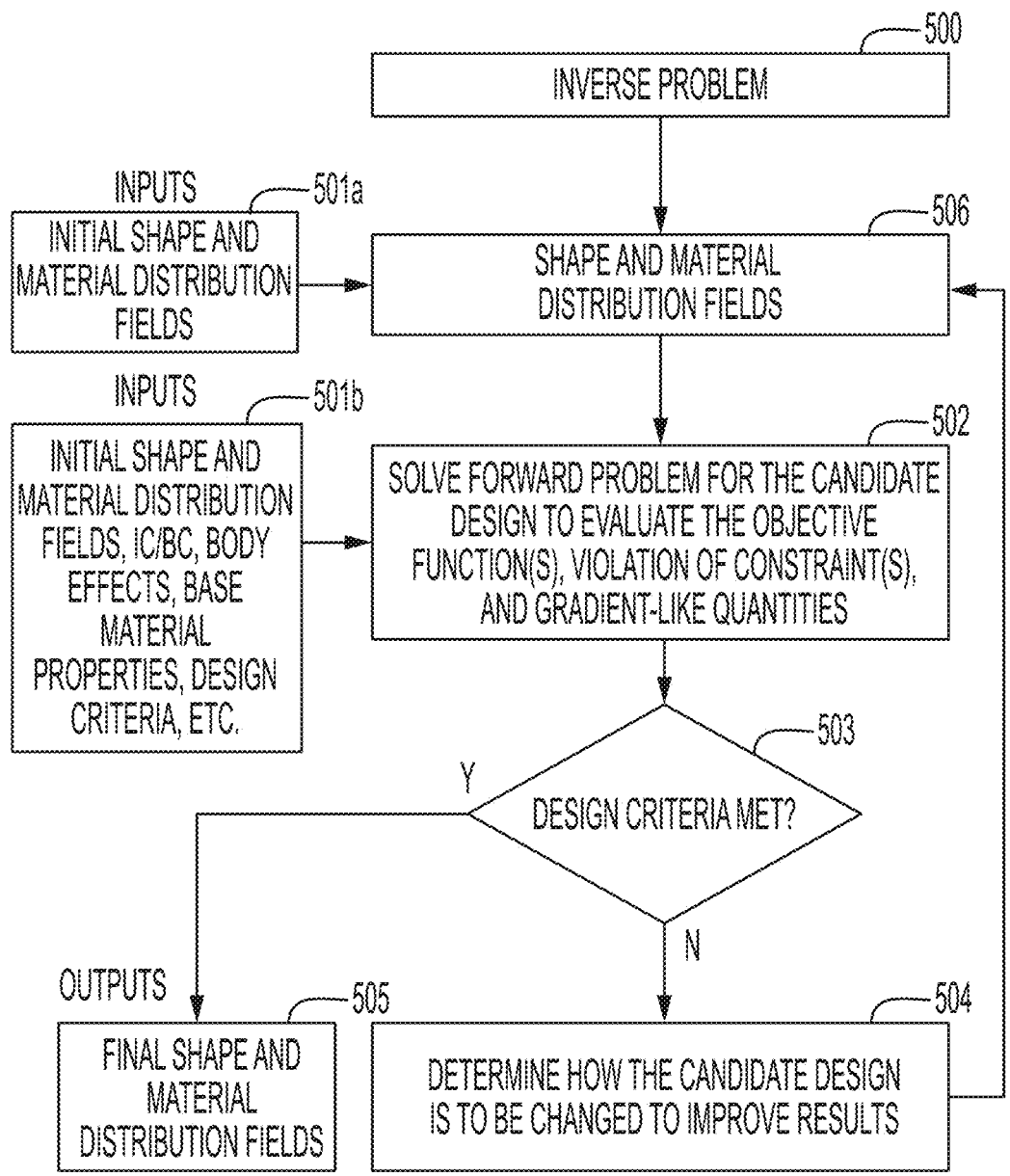

In FIG. 5, a flowchart shows a computational workflow for solving an inverse problem 500 according to an example embodiment. Inputs 501*a* include one or more initial shape and material distribution fields (represented as discrete form(s)) to use as the first candidate design(s) in the synthesis loop. Inputs 501*b* also include IC/BC, body effects, base material properties (for a finite number of available materials), and other FEA parameters. The forward problem is solved 502 for the candidate design to evaluate the objective function(s), violation of constraint(s), and gradient-like quantities. The quantities computed in 502 are used to decide whether the design criteria is met 503 (to exit the loop), and if they are not, how the candidate design is to be changed 504 to improve them. Operations 502 and 503 are repeated until the design converges to one or more solutions at which the design criteria are met. When the design criteria are met, the outputs 505 include one or more final shape and material distribution fields (represented as discrete form(s)) that have optimized performance and satisfy the design constraints.

Although the geometric and physical fields can in principle be represented in different functional bases. For example, the basis for FEA can be defined over cells of simple and regular shapes organized along a regular gird (e.g., voxels) that do not conform to the geometric shape of a particular design represented, for example, by polyhedral surface or volumetric meshes, cubic B-spline surfaces, or NURBS. A host of 'immersed boundary' methods, including meshless/meshfree FEA have been developed to use different bases for geometric representation and physical analysis, to avoid the difficult mesh generation problem, at the expense of additional challenges such as enforcing the non-conforming BCs. On the other hand, iso-parameteric and iso-geometric analyses methods exist to enable using the same basis for geometric representation and physical analysis, also avoiding meshing and re-meshing.

When the design's shape evolves in a synthesis loop and there is no preference for a specific basis over another—e.g., there is no fixed geometry with a conforming mesh to pick as the preferred discretization (e.g., to simplify imposing BCs)—it is common to pick a simple basis (e.g., over a regular grid of voxels) to populate the design space of shape and material distribution fields as well as the performance space of physical fields. The last output depends on the first two outputs (BVP solution and its derivative(s)) and is used to guide a design optimization loop. It is worthwhile taking a deeper look at step 502. It typically takes the form of assigning constitutive relationship coefficients (e.g., material properties) to the cells based on their shape and material layout—e.g., mapping volume fractions of different materials, porosity, tortuosity, etc. (geometric information) to stiffness, conductivity, resistance, permittivity, etc. For the simplest discretization scheme with binary-valued voxels (0 for empty and 1 for full) or integer-valued voxels in case of multiple indexed materials, the shape and material distribution can be mapped to constitutive coefficients by a simple look-up table. Each available material has a known elasticity tensor, conductivity tensor, etc. obtained from multiple experiments and represented in a Cartesian coordinate system. This approach assumes that the cells are small enough to assign a uniform distribution over each one of them or use a simple interpolation scheme among the vertices of the cells depending on the choice of the basis functions.

For graded composites, one needs additional assumptions to provide the mapping from shape and material distribution—e.g., the tuple ($\rho_1$, $\rho_2$, $\rho_3$) indicating volume fractions occupied by three materials—to the constitutive coefficients needed by the analysis. The mapping depends on detailed microstructure geometry, which is not captured by the volume fraction tuple, as well as how the specific materials mix together and bond at the interfaces. To circumvent fine-grained analysis at the coarse-grained level, different heuristics are used. For instance, for some physical phenomena a linear mixing model may suffice as the roughest approximation to how properties mix, e.g., $E(\rho_1, \rho_2, \rho_3) \approx E\rho_1 + E_2\rho_2 + E_2\rho_3$ to estimate the effective modulus of elasticity of a three-material composite $E(\rho_1, \rho_2, \rho_3)$ from the moduli of elasticity for base materials denoted by $E_1$, $E_2$, and $E_3$. A linear model may not be appropriate depending on the application or physical domain. For example, in the well-known solid isotropic material with penalization (SIMP) method of topology optimization, a cubic polynomial formula is commonly used to penalize partial volume fractions when crisp boundaries are favored.

More elaborate schemes are used today in microstructure design literature. For instance, aperiodic stochastic lattices such as additively manufactured Voronoi foams and k-nearest neighbor (k-NN) foams have been studied to establish a relationship between their parametric representation (e.g., sampling density and thickness) and effective unit cell material properties. Similarly, non-parameterized and topologically optimized microstructures have been studied to generate precomputed libraries of meta-material properties. To make the huge space of all possible microstructures manageable, these methods assume certain symmetries in the structure (at least up to statistical guarantees) to make the bulk behavior expressible with few variables, e.g., Young's modulus and Poisson's ratio for isotropic mechanical behavior. For example, it is experimentally observed that while the Young's modulus strongly depends on the sampling density, the Poisson's ratio does not vary significantly for open-cell foams under certain conditions.

Figure 6:
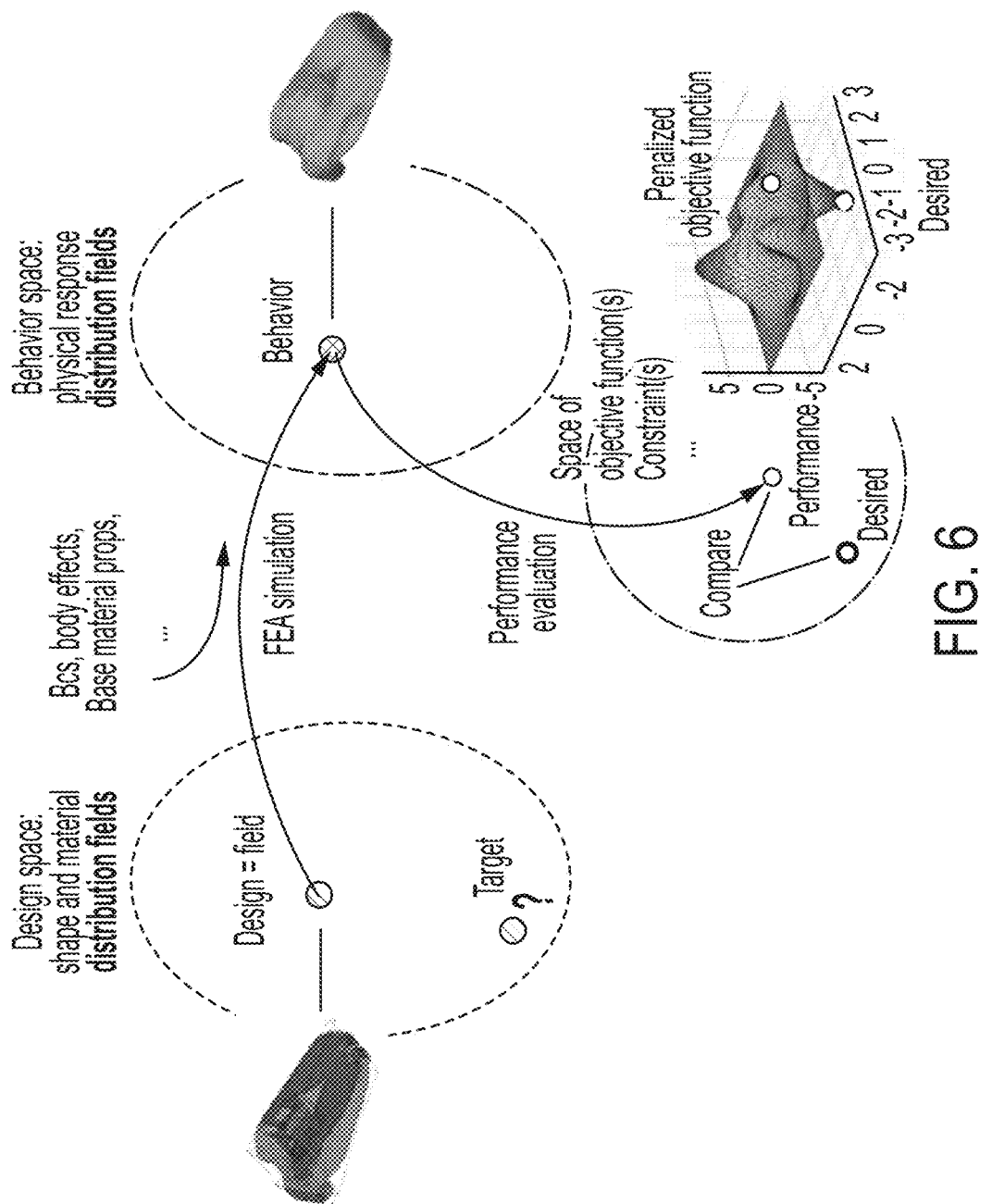
FIGS. 6 and 7 are diagrams showing an analysis and computational workflow of a single-scale, forward solution according to an example embodiment.
Figure 7:
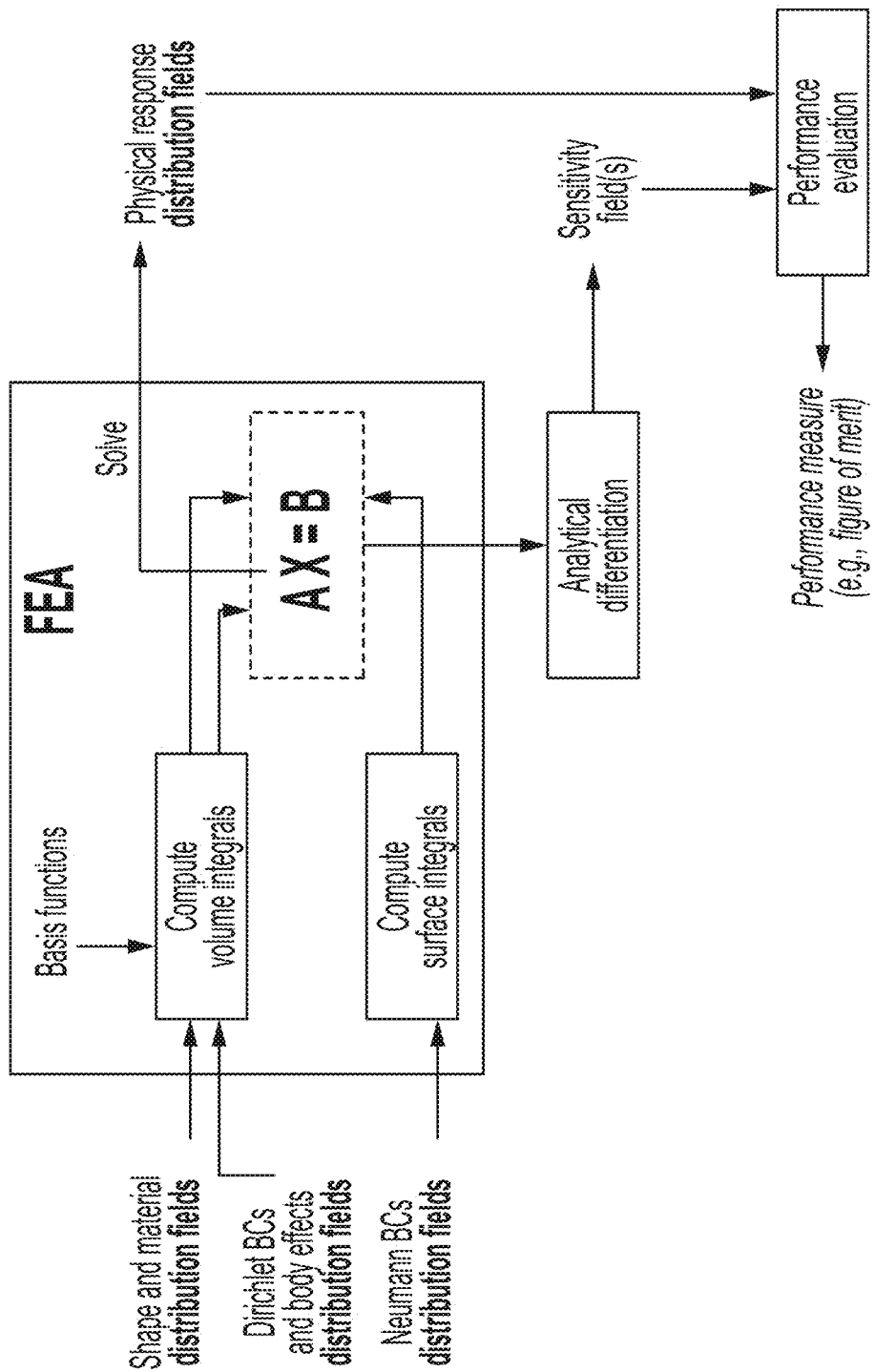

In FIG. 6, a diagram shows an abstract view of the physical analysis as a mapping from a geometric to a physical representation space. The mapping is from shape and material distribution fields to physical response fields, for a fixed set of specifications such as IC/BC, body effects, base material properties, and a policy to combine base material properties into an "effective" cell property for partially occupied cells and mixed materials, as discussed above. For a fixed set of IC/BC, body effects, base materials, and other specifications, the forward problem can be viewed as a mapping between two spaces; namely, the design space defined by all possible shape and material distribution fields; and the behavior space defined by all admissible physical response fields. In FIG. 7, a diagram shows a high-level view of the computational workflow in FEA analysis, which implements the mapping by computing volume and surface integrals, which, in turn, are used to assemble a linear system of equations solved by a standard algorithm. The response is used to evaluate the performance of the design, whether (and how much) it violates any design constraints, and so forth. The diagram of FIG. 7 is a reasonable representation of how most FEA solvers map a representation of the design (shape and material distribution fields) to a representation of performance (physical response fields).

Figure 8:
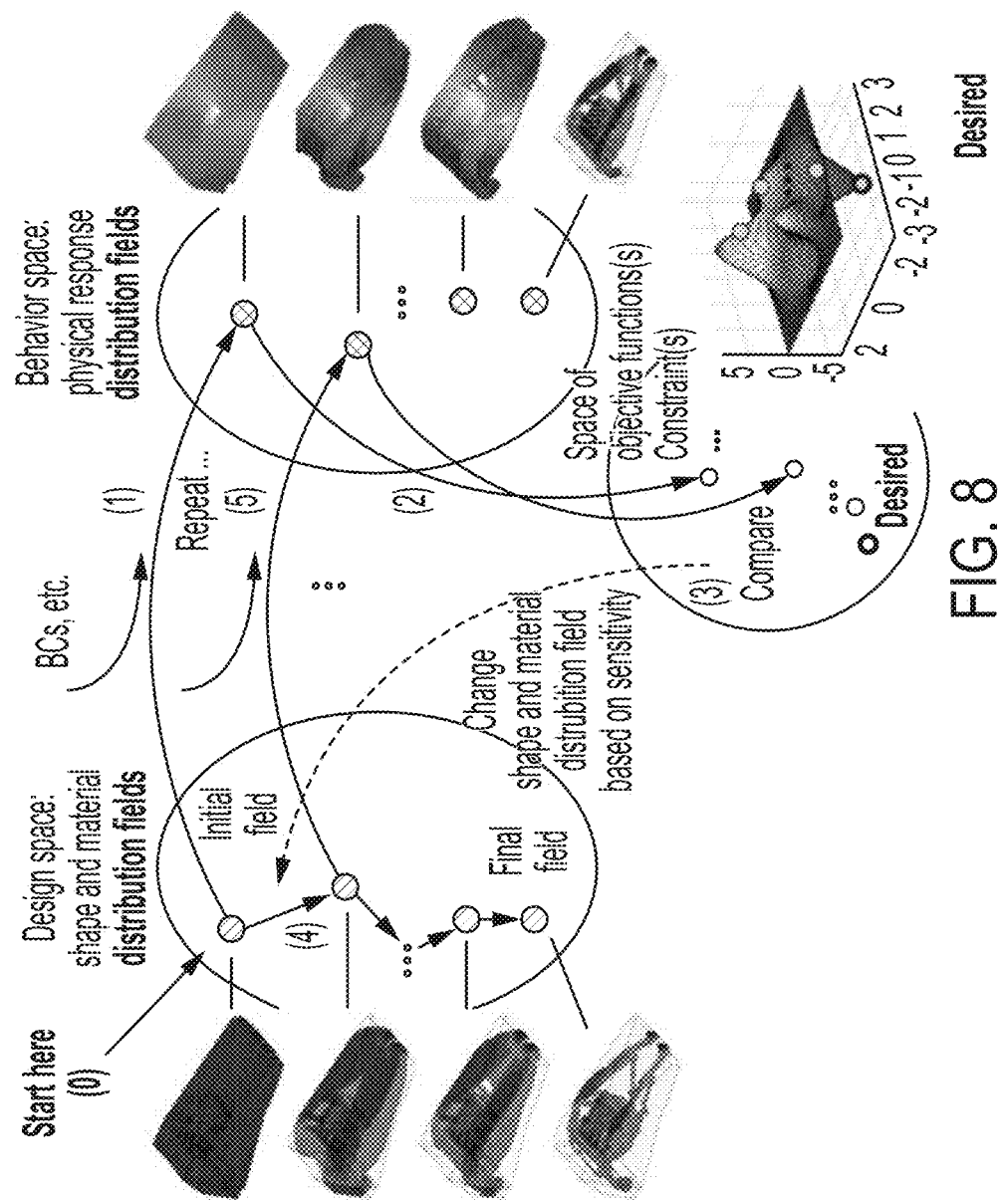
FIGS. 8 and 9 are diagrams showing an analysis and computational workflow of a single-scale, inverse solution according to an example embodiment.
Figure 9:
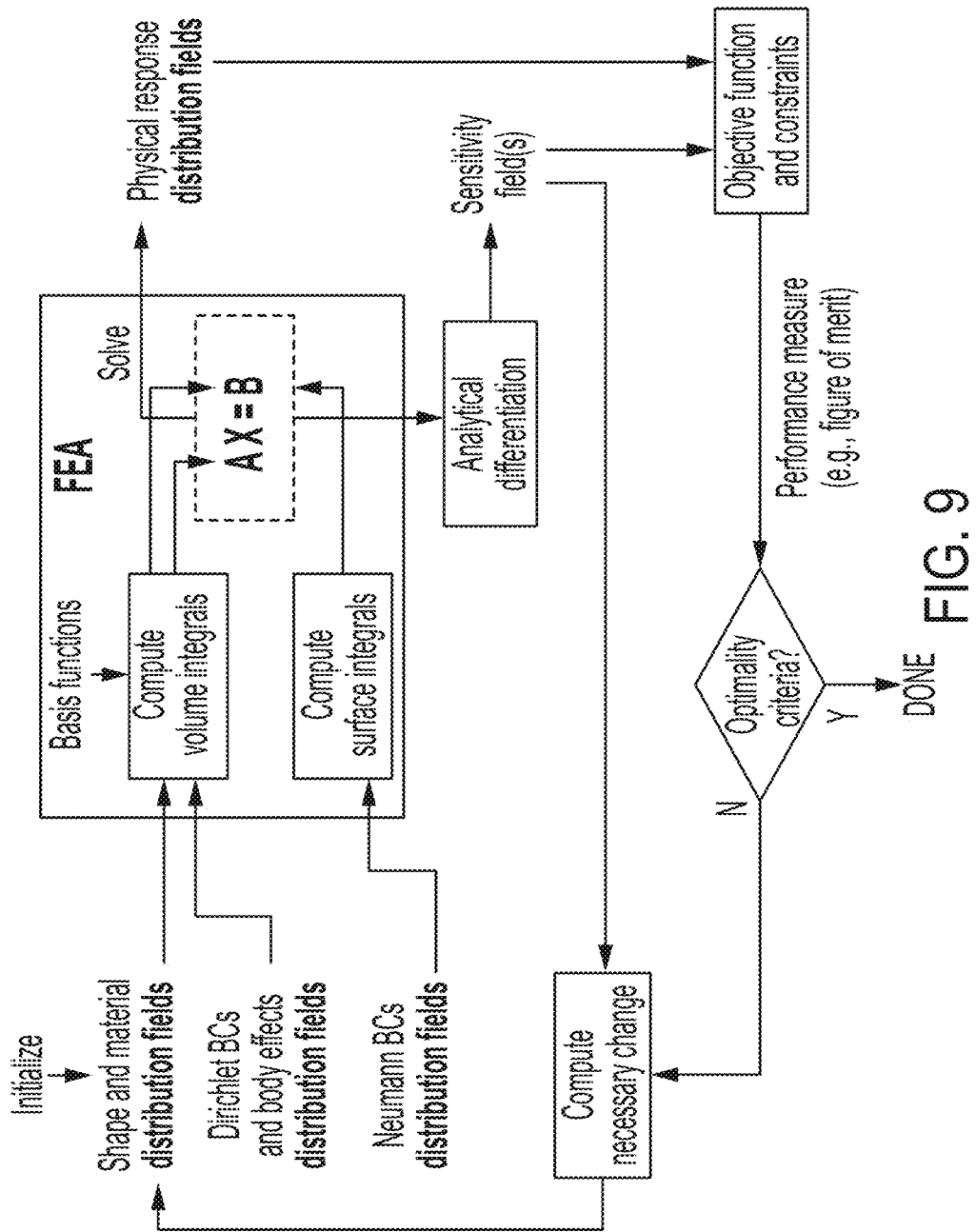

The inverse problem is to find a shape and material distribution that has optimized performance and satisfies specified constraints. In the absence of a closed-form solution, the inverse problem is solved by iteratively solving the forward problem and making changes to the design until it satisfies the criteria. In FIG. 8, a diagram shows an abstract view of the design synthesis (inverse problem) as an iterative process in which the physical analysis (forward problem) of FIG. 6 is called repeatedly 801, 805 to refine the shape and material distribution 804 based on evaluation 802 of the achieved performance and its comparison 803 with the desired performance. In FIG. 9, a diagram shows a high-level view of the computational workflow in design synthesis by adding a feedback loop to the FEA analysis of FIG. 7. To steer the optimization into local optima, a gradient-like quantity (e.g., sensitivity field) 808 is also computed as seen in FIGS. 8 and 9.

The material densities assigned to the cells (e.g., voxels) are the decision variables that are used to evaluate the objective functions, constraints, and their gradients. These quantities are in turn used to make changes to the design variables—e.g., add, remove, replace, or change the density of base materials at the cells depending on how much they are contributing to the overall performance measure and how sensitive these measures are to their (hypothetical) variations, as captured by FIGS. 8 and 9.

The key takeaway from a closer look at these workflows is that for a fixed choice of the basis functions, the information needed to evaluate the performance determine the class of integral properties that need to be computed. For example, in the case of FEA, the solution depends on the coefficient matrix A and stimulus vector B in the assembled system of equations, which, in turn, depend on the following quantities: the volumetric integral properties of shape and material distribution fields, Dirichlet BCs, and body effects; and the surface integral properties pertaining to Neumann BCs. This is not surprising as the FEA is entirely based on integral/weak forms of the BVP. Note that the estimation of effective constitutive properties from distribution field values are also important only to the extent that affects the integral results.

In order to separate the scales, it should be understood that the information needed for physical analysis are integral properties of the shape and material distribution fields. As long as one has access to the required minimum information to compute the volume and surface integrals used in assembling the linear system of equations at a granularity that is adequate at a given size scale, one can (in principle) find the physical behavior relevant to that size scale. Accordingly, one can directly design the integral properties at that size scale and postpone finding the fields that have those properties to a later stage—e.g., design at the finer level or manufacturing process planning.

The next section describes forward and inverse problems at multiple size scales, organized at multiple levels or granularity. The design space is enormous if the shape and material distribution fields are discretized at the finest-grained resolution (e.g., enabled by today's high-resolution manufacturing). To reduce the number of degrees of freedom, it is common to use a multi-scale synthesis approach based on scale-dependent analysis. The BVP is re-framed in terms of homogenized properties ("up-scaling") by assuming correlations between effective physical constitutive law coefficients and statistical average of base material distribution in each cell. The synthesis proceeds in the opposite direction, where the analysis is repeated in a loop to design for homogenized properties. The detailed structure at a finer-grained scale is obtained by inverse homogenization ("down-scaling"). This process is rarely extended beyond two scales, a macro-scale and a meso-/micro-scale, depending on the method and its assumptions.

Many existing methods use the notion of "micro" too permissively, even when the cells (sometimes called 'unit cells') are too large to justify the existence of a meso-scale for statistical guarantees. The assumption that a single (e.g., tensorial) constitutive relationship (e.g., stress and strain related by a single elasticity tensor) is representative of the cell's behavior amounts to viewing every unit cell as a "material point" with a small, effectively infinitesimal, neighborhood that is only approximated by a single finite element for analysis. This is not always true, leading to low-fidelity analysis.

A "design for properties" methodology is described herein that does not make assumptions on the size of the cells at different length scales, does not rely on a single (e.g., tensorial) constitutive equation to approximate a cell's complicated behavior at a given scale, and does not limit one to a particular parameterized design regime (e.g., foams) upfront. The decisions on realization of the designed properties or parameterization are postponed as much as possible to a later stage in the design process, e.g., a manufacturing process planning stage, when a process plan is found to fulfill a set of declared properties at different length scales.

The goal is to design for a series of "surrogate" integral properties $p(c_k)$ in Equation (2) assigned to the cells $c_k$ at some $k^{th}$ level of the hierarchical representation that not only satisfy the additivity, continuity, completeness, and convergence characteristics discussed earlier, but also are physically relevant, meaning that knowing the values of these properties about the design is sufficient to infer physical behavior that is relevant at the length scale of interest. From a computational point of view, this depends on the type of the physical analysis tool and what information about the shape and material layout it needs to perform its computations with a reasonable degree of accuracy and fidelity.

Figure 10A:
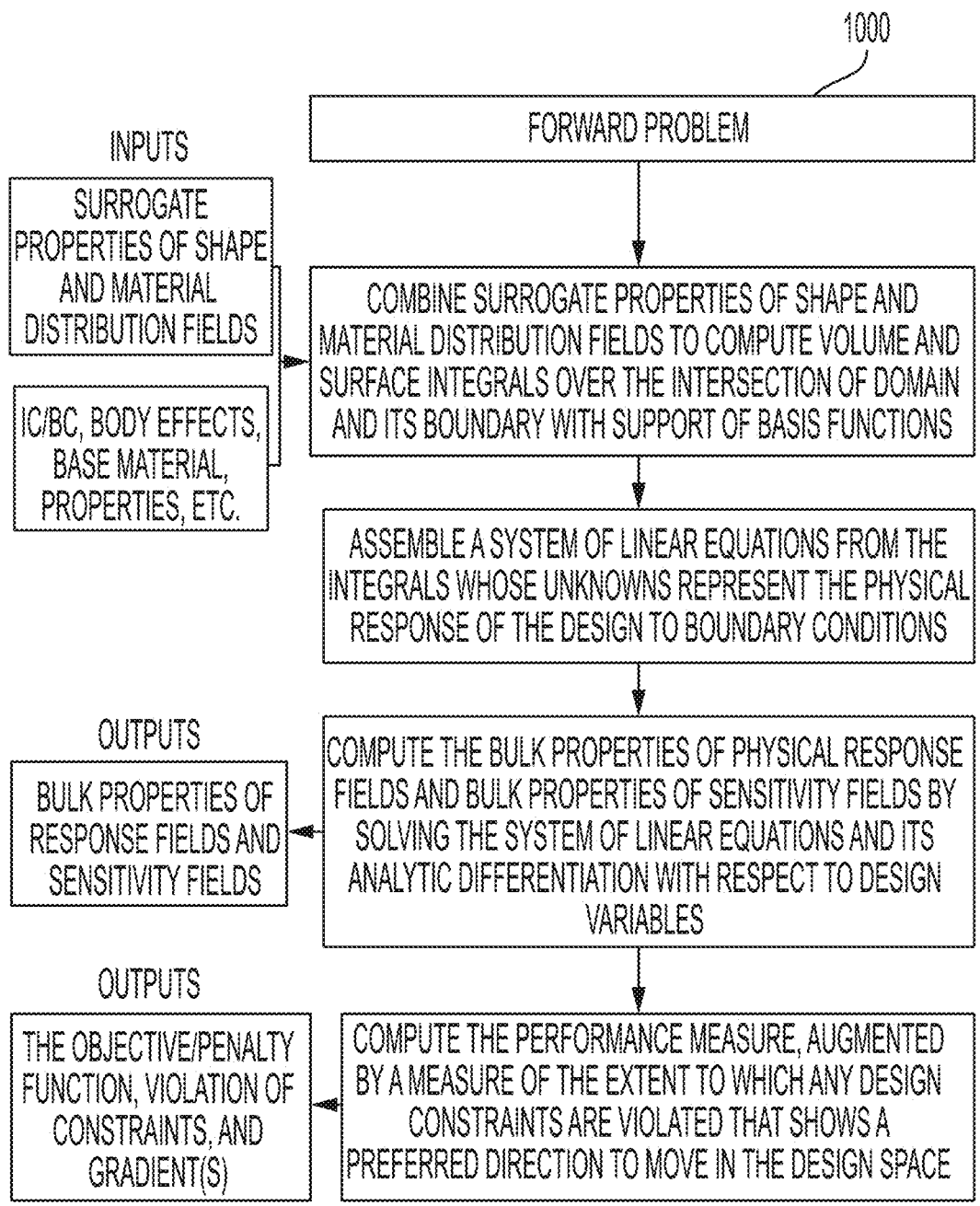
FIGS. 10A and 10B are flowcharts showing a forward and inverse problem solution according to other example embodiments.
Figure 10B:
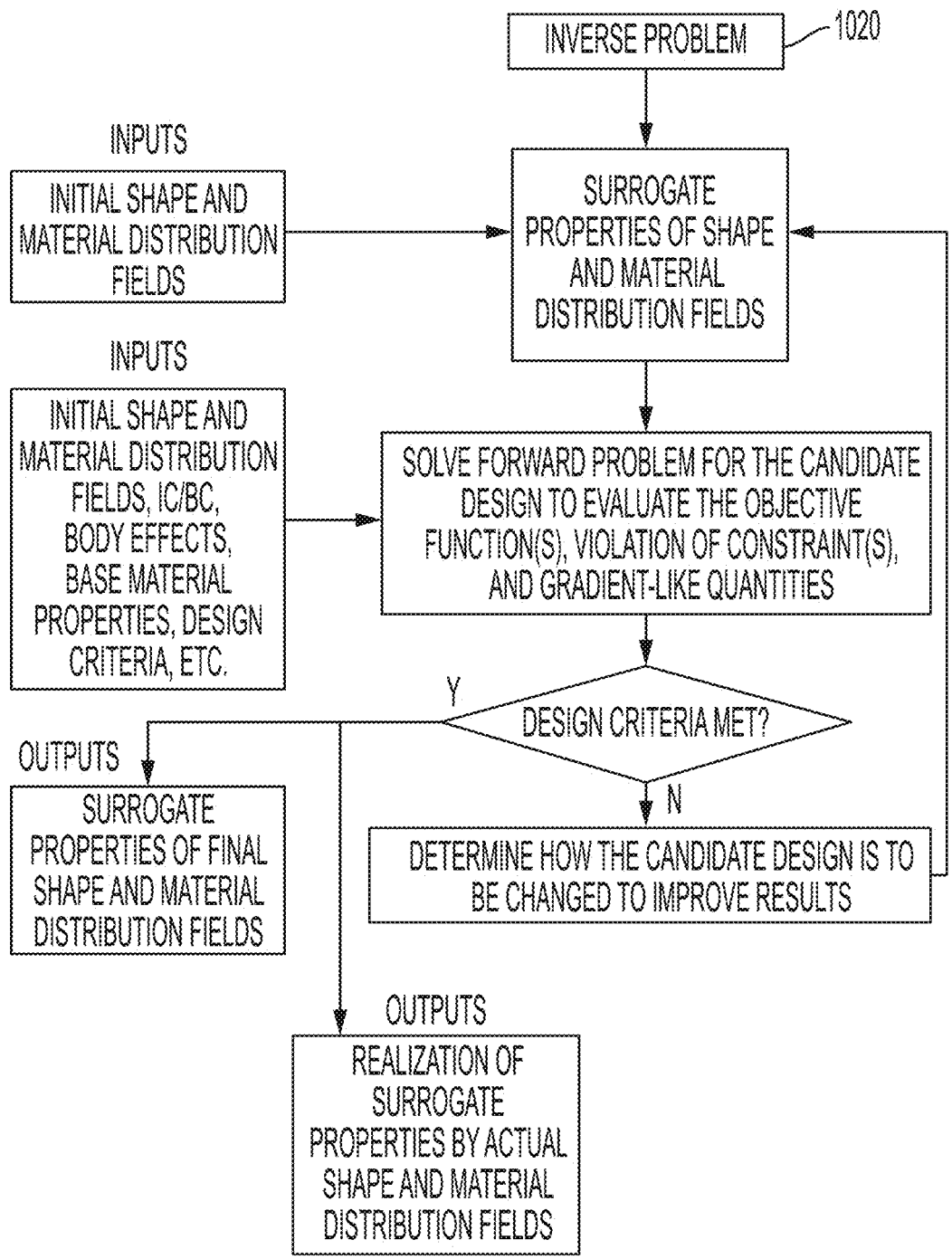

For example, FEA solvers typically attempt to solve weak/variational forms of BVP, which relies on integrating the shape and material distribution fields over the supports of basis functions. If the integrand is represented in terms of a linear combination of the basis functions, all such integrals can be expanded in the said basis. The linear system of equations in FEA can be assembled from these integral properties, without knowing the precise details of the shape and material distribution over which they are computed. In other words, they are an informationally complete representation of the shape and material distribution for the purpose of FEA, up to the inevitable approximation due to FEA discretization. The realization problem, which is to find the shape and material distribution fields that give rise to those integral properties can be postponed. Therefore, the computational workflows for solving the forward problem 1000 and inverse problem 1020 can be reconfigured at a high level as a set of steps as shown in the flowcharts of FIG. 10A and FIG. 10B, respectively, according to example embodiments.

Note that that FIGS. 4 and 5 are example embodiments of state-of-the-art for forward and inverse problems. The main difference between the flowcharts shown in FIGS. 4 and 5 and the respective flowcharts of FIGS. 10A and 10B is that the design variables are no longer the distribution fields, but their surrogate (e.g., integral) properties; for example (but not necessarily) volume fraction and higher-order harmonic amplitudes for spectral FEA solvers, and so on. On the other hand, the performance variables are no longer the physical response fields, but are bulk properties of such fields observed at a chosen scale.

In practice, one can only represent the information content of a cell with a finite number of surrogate properties, such as volumetric integral properties. Fortunately, for proper choice of basis functions, a partial sequence of first $m \geq 1$ properties $\mu_t(v_k)-(\mu_t^1(c_k),\mu_t^2(c^k), \ldots, \mu_t^m(c_k))$ provides sufficient information to approximate the
integrals needed for physical analysis that converge to the exact values as $m \to \infty$ with quantifiable bounds of truncation error.

Surface integration is another fundamental task in FEA which may be required to impose Neumann BCs in the weak variational form. In a similar fashion to volumetric distributions, surface distributions (e.g., force, flux, flow, etc.) are also representable as discrete forms. Accordingly, surface integral properties at-scale can be obtained without actually knowing the precise surface distribution at the finest detail.

Figure 12:
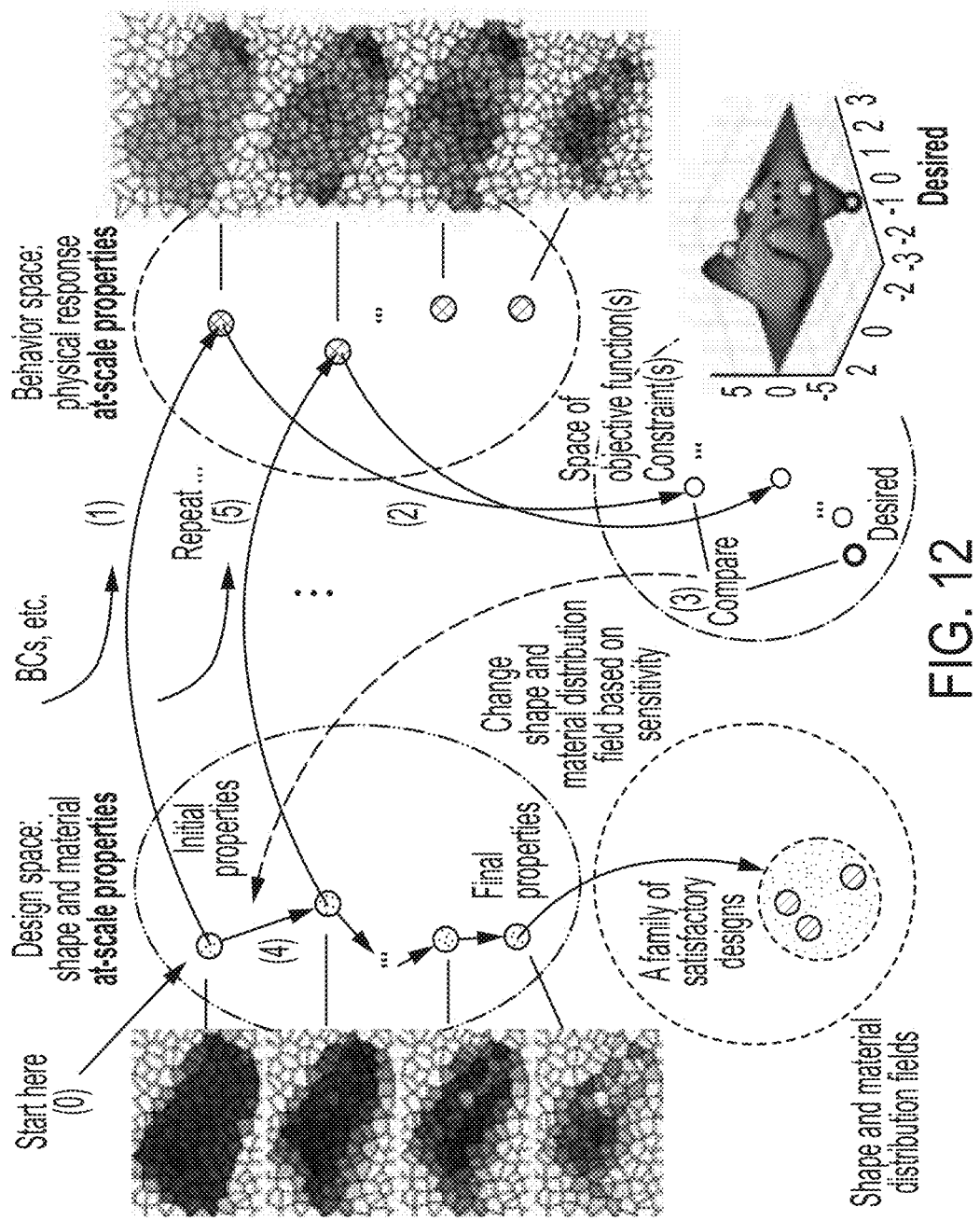
FIGS. 12 and 13 are diagrams showing an analysis and computational workflow of a single-scale, inverse solution according to another example embodiment.

The diagram in FIG. 12 updates the abstract view of the physical analysis presented earlier in FIG. 6 by viewing it as a mapping from the space of integral properties of the base material distribution fields—as opposed to the fields themselves—to the space of bulk properties of physical response fields. Each property set is viewed as a point in the new design space, which corresponds to an entire family—technically, an 'equivalence class'— of shape and material distribution fields in the original view of the design space in FIG. 6. The process in FIG. 13 accordingly updates the high-level view of the computational workflow in FIG. 6, where the burden of volume and surface integration is removed from the FEA tool because it no longer has access to a detailed representation of the shape and material layout. The required integrals are computed from a combination of input integral properties.

Figure 10C:
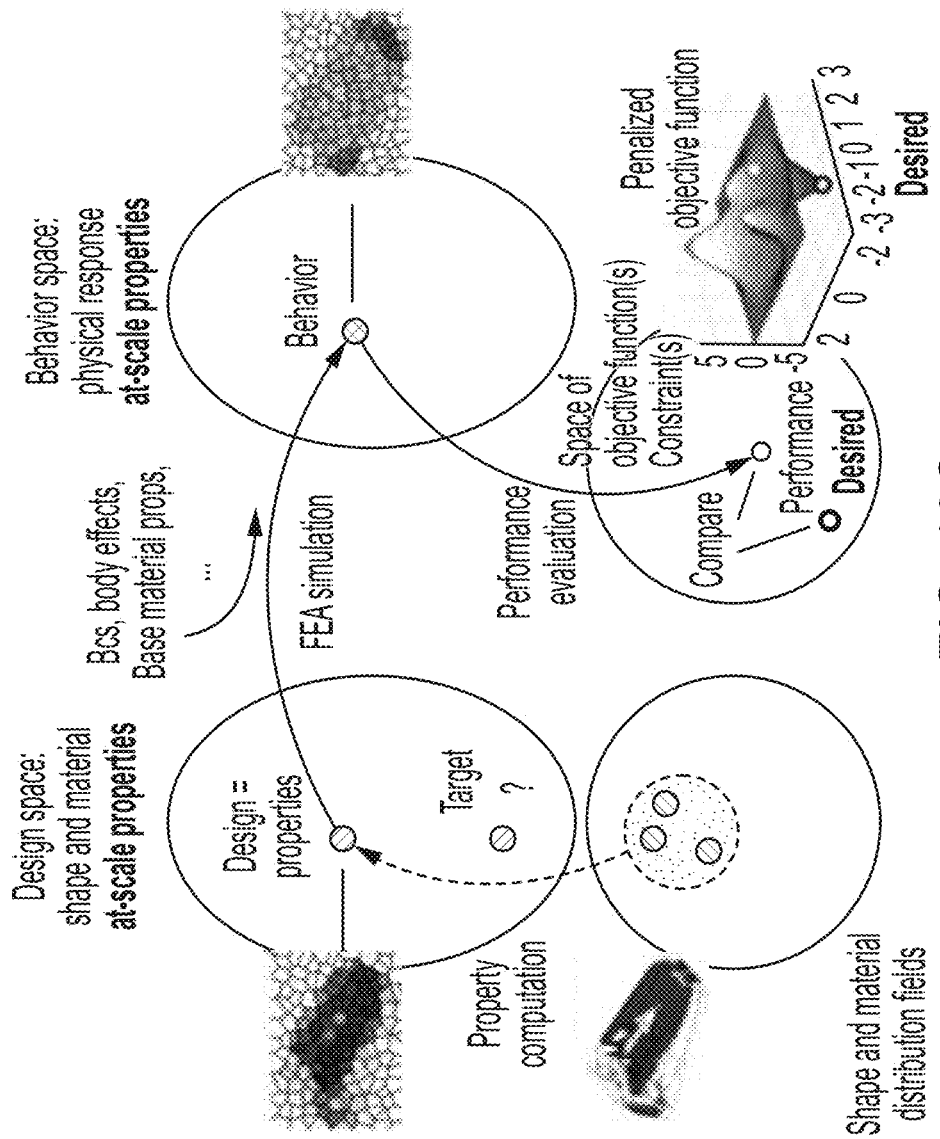
FIGS. 10C and 11 are diagrams showing an analysis and computational workflow of a single-scale, forward solution according to another example embodiment.
Figure 11:
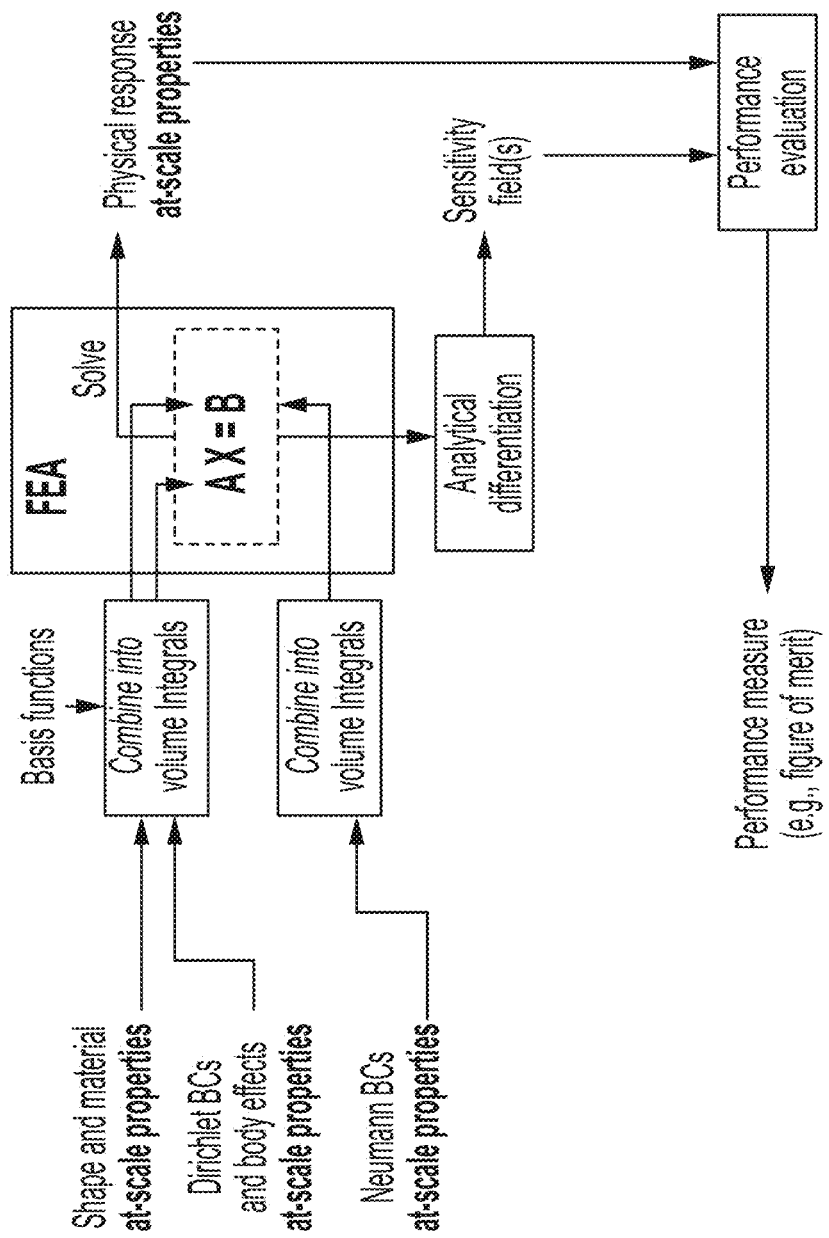
Figure 13:
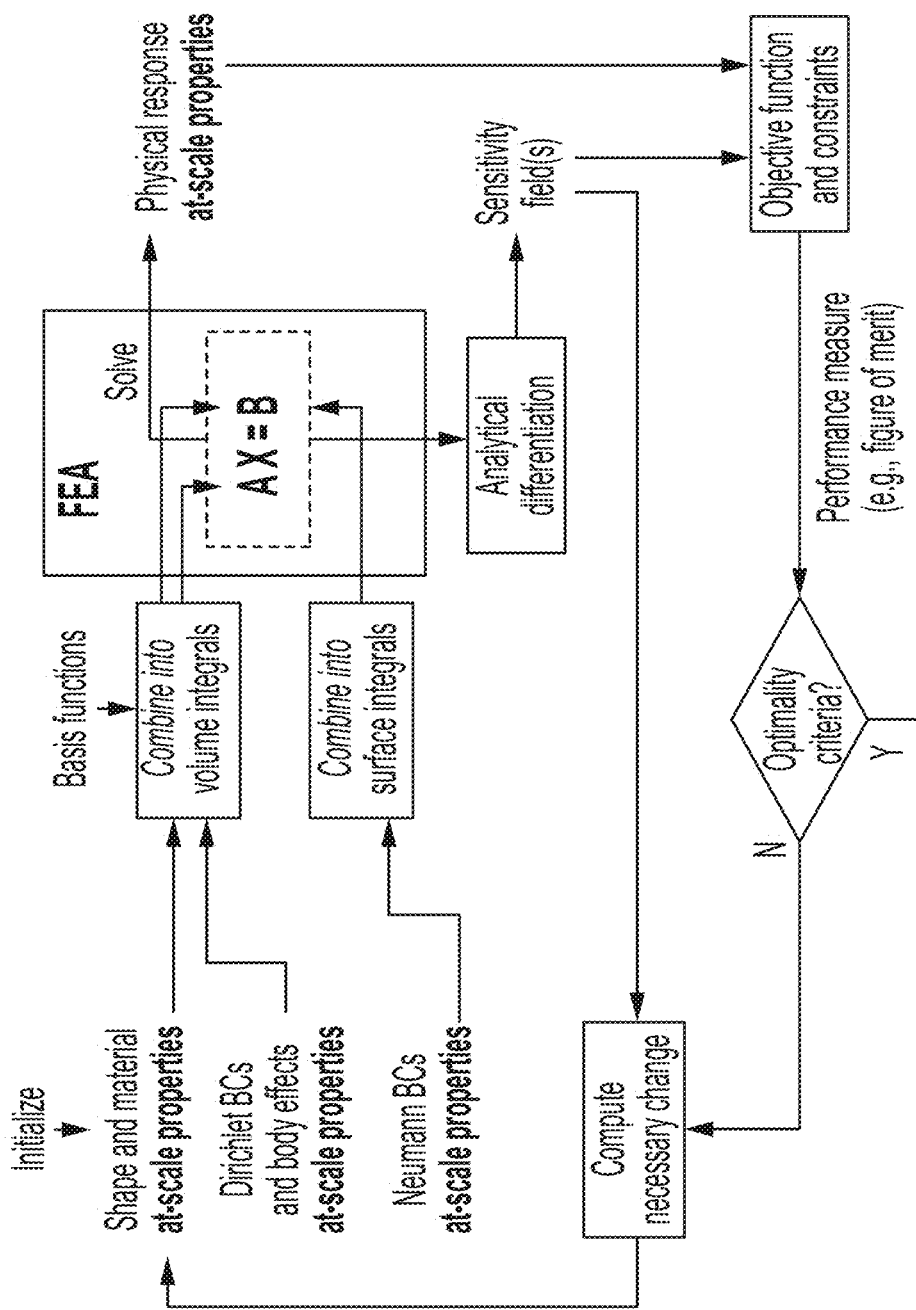

The diagrams in FIGS. 12 and 13 illustrate the closed-loop synthesis based on the physics solver in FIGS. 10C and 11. The decision variables are the integral properties themselves rather than the precise shape and material distribution fields that realize them. As such, the synthesis of shape and material layout is bypassed and postponed as it does not affect the evaluation of objective function, constraints, and their gradients within the coarse analysis.

Surrogate properties can be set up as projections of the shape and material distribution fields onto a functional basis, e.g., components of the fields in some Hilbert space that is appropriate for the physics problem and solver class. The key is to set these properties up in such a way that they capture increasingly more details of the topology and geometry of the base material with increasing order of the basis function on which they are projected. To leverage this refinement, more properties will be kept as the multi-scale design process moves down in scale. For example, the $0^t$-order integral property (e.g., volume fraction) can be used to design at the macro-scale while higher-order properties (e.g., high-frequency harmonics) are designed at the meso-/micro-scale. In this case, our method subsumes existing inverse homogenization methods with the exception that it uses a surrogate variable (such as the volume fraction at each cell) with the understanding that it is all one needs for a coarse analysis, meaning that volume fraction can be used as a "proxy" for physical properties such as stiffness or conductivity if the cells are small enough to capture their behavior by a single stiffness or conductivity tensor. However, our method extends beyond classical (forward and inverse) homogenization as it enables a trade-off between granularity and number of surrogate properties one retains per cell (e.g., high-frequency harmonics for spectral analysis) provides flexibility to choose cell size, hence enables a top-down design that starts from coarse-grained cells. The decided volume fraction at the coarser-grained scale is passed onto the finer-grained scales as a constraint, e.g., equality constraint inferred from additivity of the surrogate properties in Equation (3). Deciding the properties that capture more details, e.g., high-frequency harmonics, are postponed to the finer-grained levels, e.g., to restrict the detailed microstructure shape. For a given cell $c_k$ at the $k^{th}$ level, its children must satisfy the equality constraints, one for each base material, as shown in Equation (4) below.

$$\mu_i^0(c_k) = \sum_{c_{k+1}^* \in ch(c_k)} \mu_i^0(c_{k+1}^*), \text{ for } i = 1, 2, \ldots, n. \quad (4)$$

Once the most significant surrogate properties of each base material for a parent cell $c_k$ is decided (and, potentially optimized) based on the coarse-grained analysis, the optimization at the finer-grained scale is tasked with re-distribution of the fixed "budget" of base material within each parent cell (decided in the coarser-grained synthesis) among its children $c_{k+1}^* \in ch(c_k)$. In other words, the total amount of the base materials per cell at the $k^{th}$ level can change at the $k^{th}$ level synthesis, but remains unchanged at the $(k+1)^{th}$ and subsequent levels' synthesis. The total material is only exchanged among the children within a parent cell but not between them and their cousins, captured by the equality constraint in Equation (4). This link between the scales is generalized as shown in Equation (5), where the index $j \geq 0$ implies an ordering among the surrogate properties from the most significant to the least significant—e.g., low-order to high-order, low-frequency to high-frequency, and so forth, depending on the context.

$$\mu_i^j(c_k) = \sum_{c_{k+1}^* \in ch(c_k)} \mu_i^j(c_{k+1}^*), \text{ for } i = 1, 2, \ldots, n. \quad (5)$$

In general, these methods assume a hierarchical cell decomposition in which a partial sequence of at-scale surrogate properties is assigned as unknowns to the cells at different levels. For example, integral properties obtained as projections or inner products (in Hilbert space) of the shape and material distribution fields with basis functions can be ordered according to their significance.

The sequence of integral properties is divided among the different levels, as long as it makes sense to design for the level of detail that they provide at the length scale under consideration and it can be used in a meaningful fashion by the analysis at-scale. Any division is acceptable as long as more of the most significant properties are decided in the proper order as the synthesis proceeds down the scales.

Figure 14A:
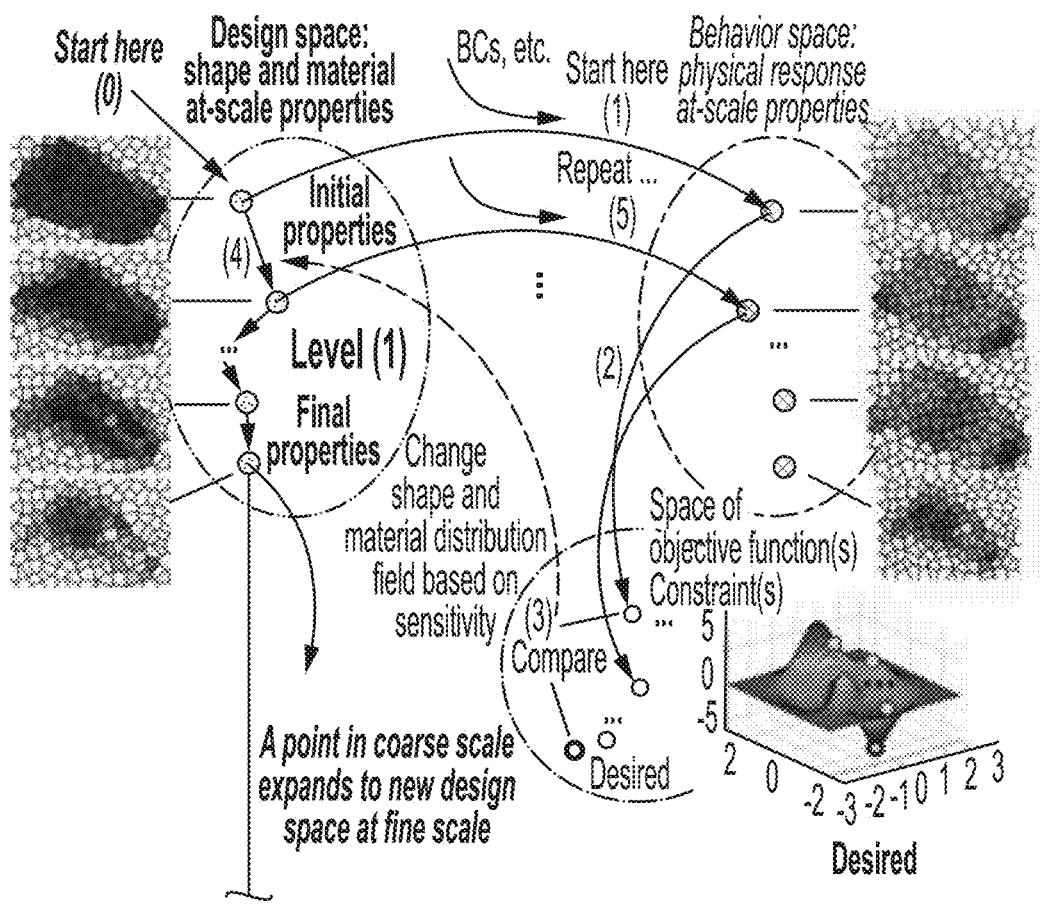
FIGS. 14A, 14B, 15A, 15B, and 15C are diagrams showing an analysis and computational workflow of a multi-scale, inverse solution according to another example embodiment.
Figure 14B:
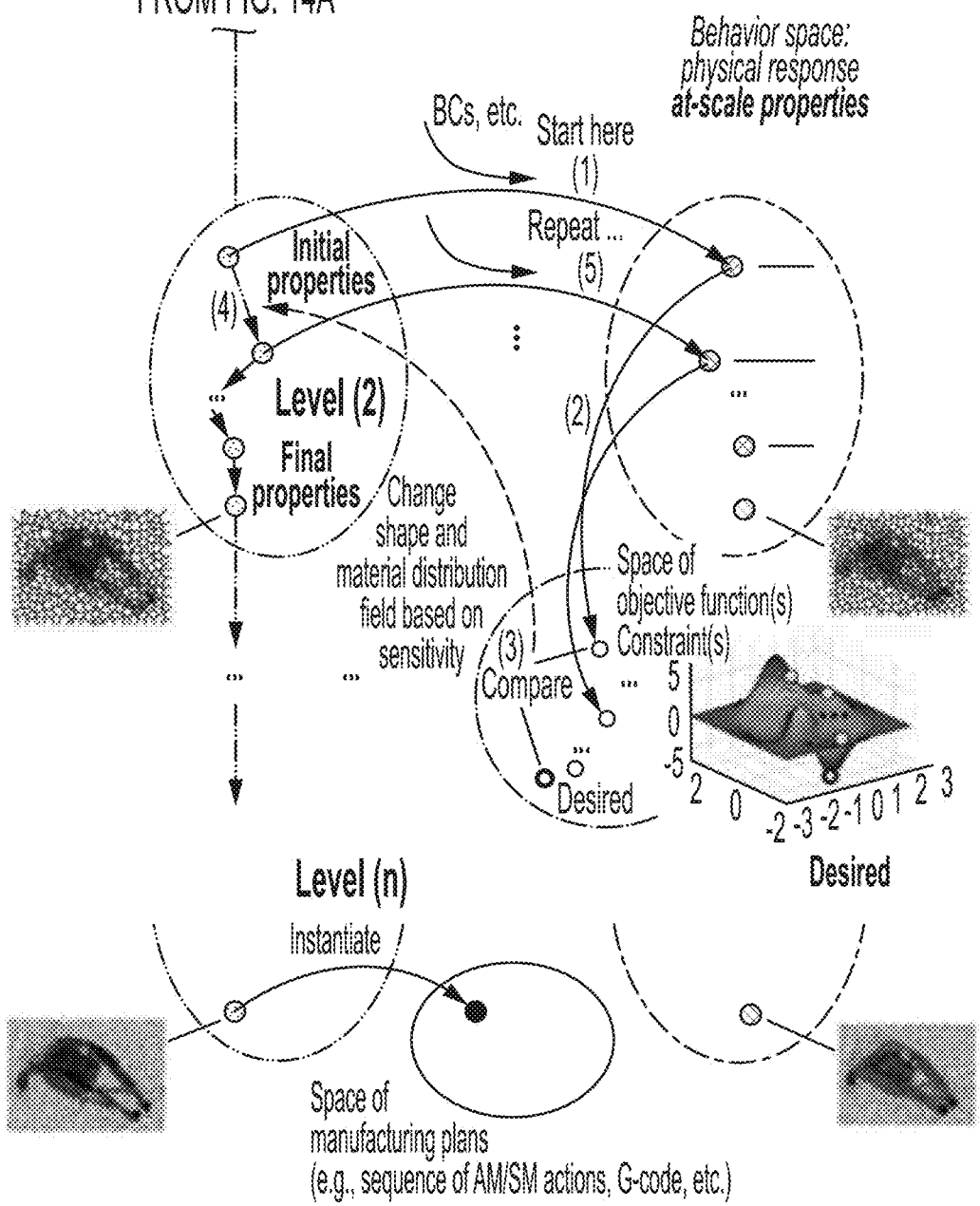
Figure 15A:
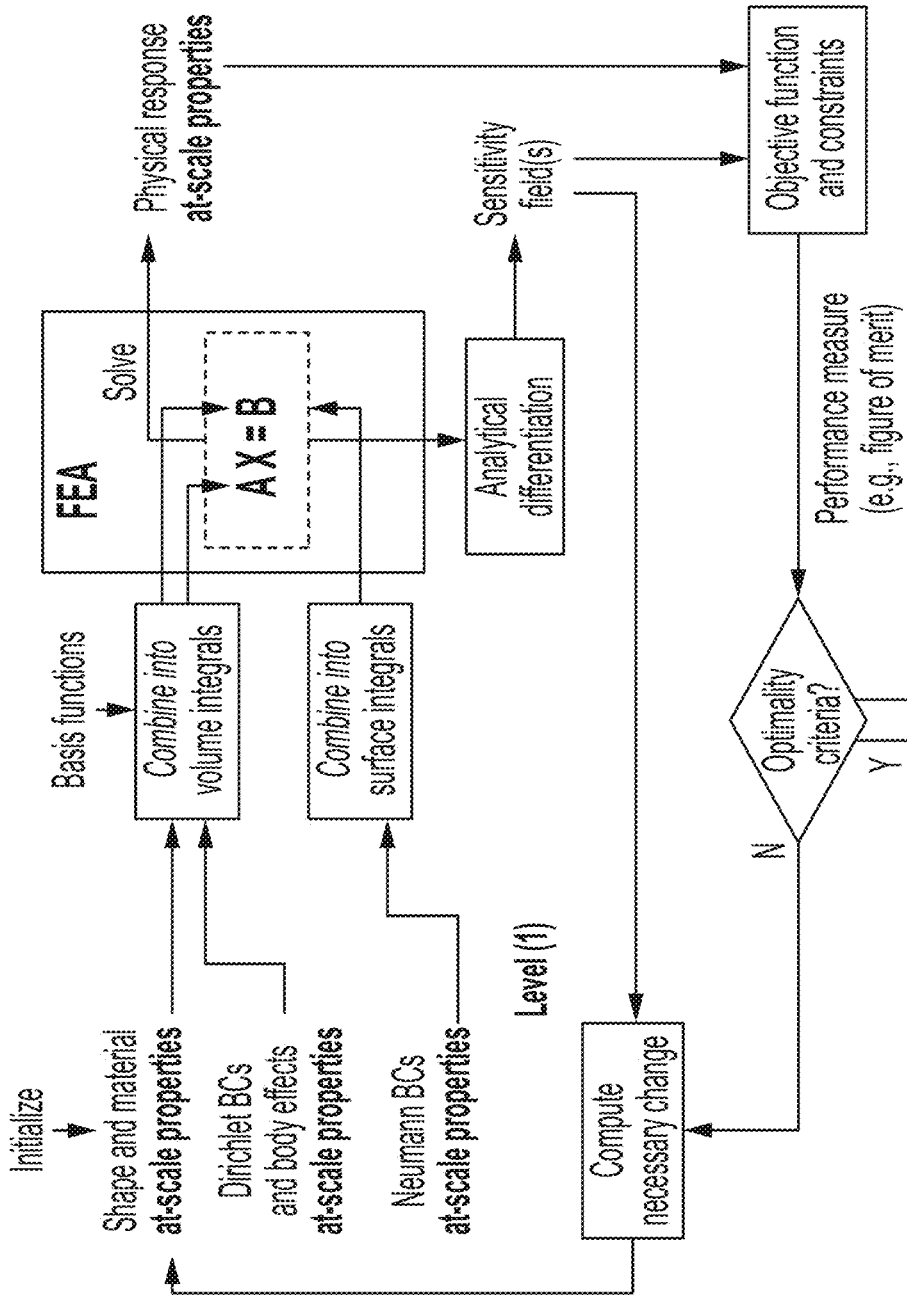
Figure 15B:
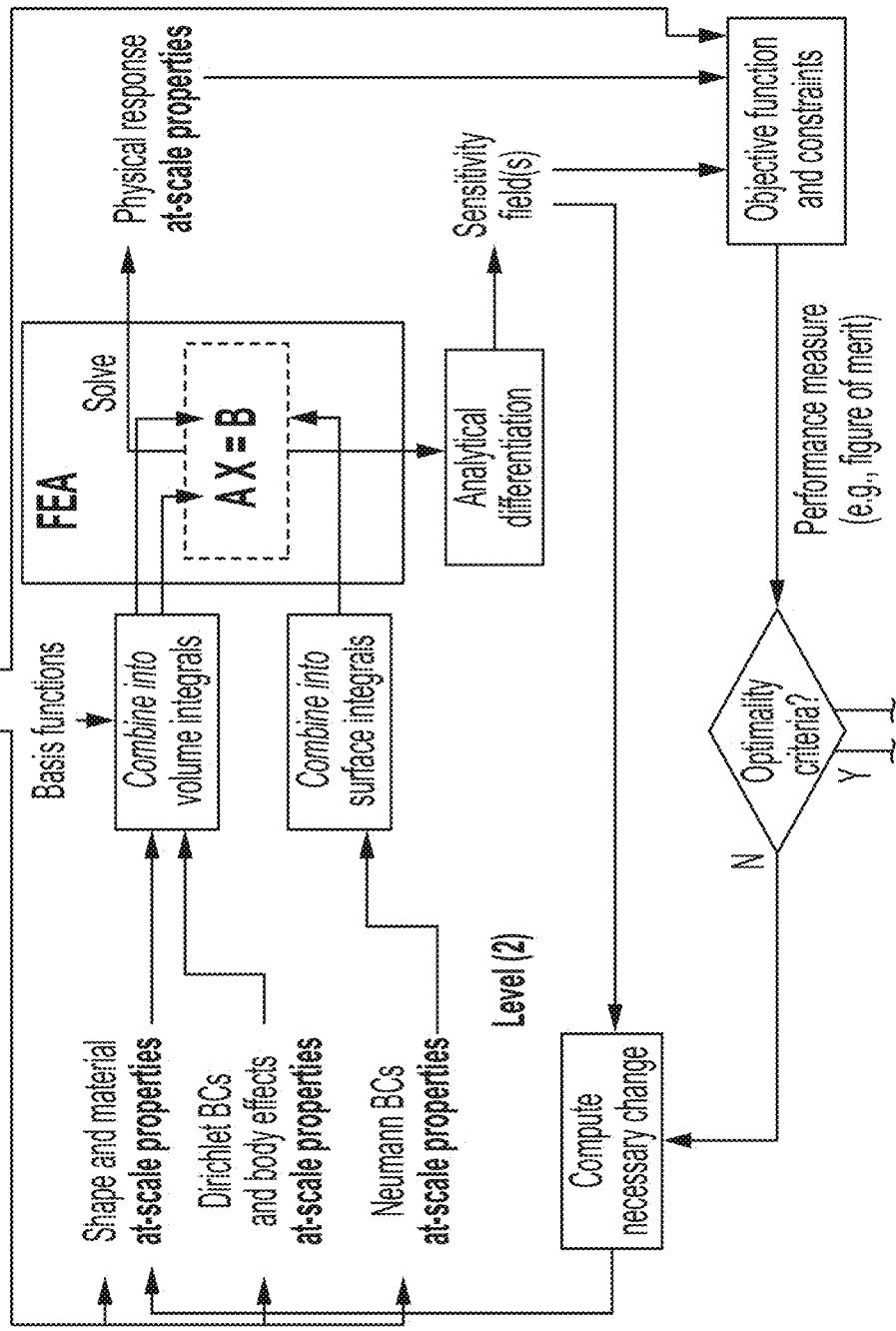
Figure 15C:
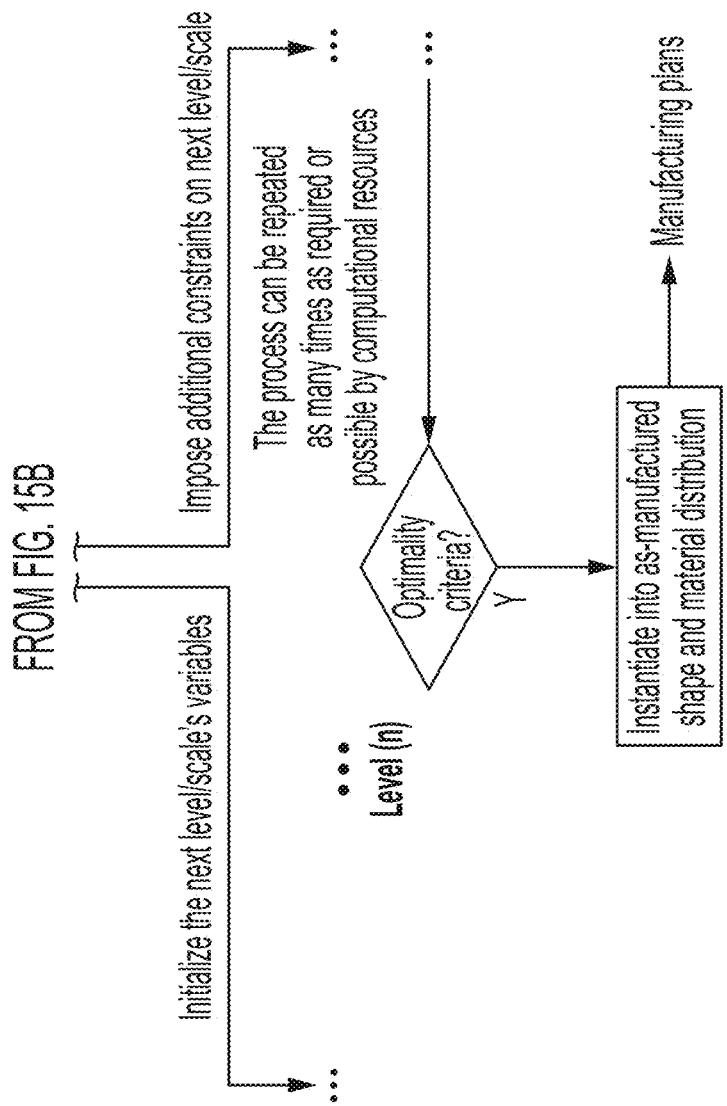

As this happens, the equivalence class of designs associated with the optimized surrogate properties per cell keeps shrinking as the synthesis proceeds down the scales, as show in FIG. 3. The design at the finest-grained level of detail is represented by K properties in Equation (1) which are restrictive enough to be realized within manufacturing tolerances. The abstract view of the multi-scale synthesis using at-scale surrogate properties is shown in FIG. 14, which extends FIG. 12 from single to multi-level top-down design. The computational workflow for this process is shown in the diagram of FIG. 15, which extends FIG. 13 from single to multi-level top-down design.

Every design at the a given level is a discrete form made of a finite sequence of at-scale surrogate properties per cell that "declaratively" represent an equivalence class of shape and material distribution fields. The optimized properties are passed to the next scale as equality constraints (e.g., due to additivity) that need to be satisfied alongside physical constraints that are specific to the size scale. The IC/BC are also populated as constraints in terms of the at-scale properties of cell boundaries. This process is repeated to narrow down the family of designs until it is reasonably detailed to be realized (within a narrow band of variation) by an actual shape and material distribution, e.g., parameterized microstructures (e.g., foams) or manufacturable shapes populated by a manufacturing analysis or process planning method.

The inputs include one or more initial surrogate integral properties at-scale of the shape and material distribution at the coarsest-grained level, represented as discrete form(s). This will be used as the first candidate design(s) in the synthesis loop at the $1^{st}$ level in the hierarchical cell complex. Additional inputs include IC/BC, body effects, base material properties (for a finite number of available materials), and other solver-specific (e.g., FEA) parameters at the $1^{st}$ level.

Figure 16:
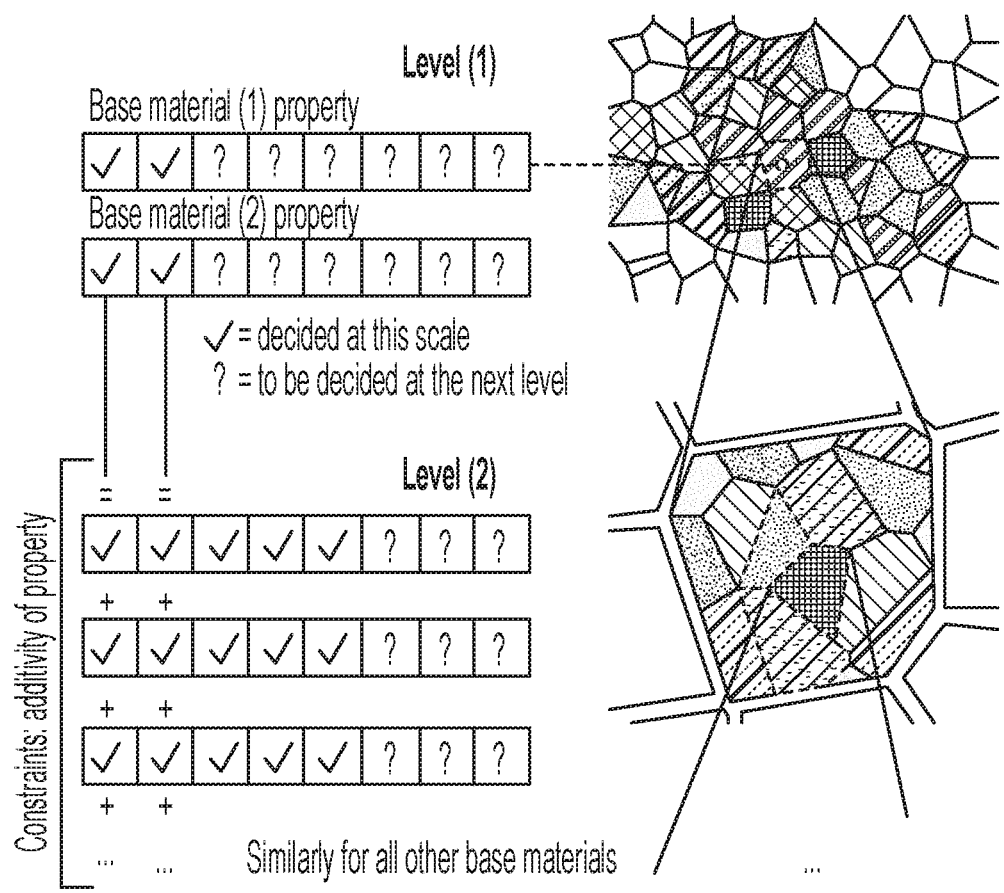
FIG. 16 is a diagram showing changes of at-scale properties at different hierarchies for a design according to an example embodiment.

At the $k^h$ level (for k=1, 2, . . . , K), the forward problem is solved for the candidate design to evaluate the objective function(s), violation of constraint(s), and gradient-like quantities at the $k^{th}$ level using the physics solver that simulates physical behavior at the length scale range ($L_k \perp e_k$) that characterizes the $k^{th}$ level's variation of cell sizes. The quantities computed in the forward solution are used to decide whether the design criteria are met (to exit the loop), and if they are not, how the candidate design represented by the at-scale properties per cell is to be changed to improve them, as shown in the diagram of FIG. 16. In FIG. 16, a partial sequence of at-scale integral properties are optimized at each level, to a point that they capture sufficient detail about shape and material layout. As one goes down the hierarchy, more properties are discovered, some of which are subject to constraints imposed by parent representation (e.g., additivity). Other surrogate properties and types of constraints to link the design representation at consecutive levels (parent-child relationships) are conceivable.

The above forward solution and decisions are repeated until the design converges to a solution at which the design criteria are met. The above steps are then repeated for the next level in the hierarchy, e.g., go from k to (k+1) and repeat the process for a more limited region of spacer, to optimize the finer-grained properties of the children $c_{k+1}^* \in ch(c_k)$ of the cells $c_k$ over which further refinement is deemed necessary according to problem-specific criteria. The optimized properties are used at the $k^{th}$ scale to populate the BCs for the $(k+1)^{th}$ scale and impose the constraints in Equation (3) or (5) in addition to the physical constraints relevant to the $(k+1)^{th}$ scale.

The output of this process is one or more final properties at-scale of shape and material distribution fields at the finest-grained level (represented as discrete form(s)) that have optimal performance and satisfy the design constraints. This algorithm takes a "lazy evaluation" approach towards determining the actual shape and material layout. At no point along the costly optimization loops one requires to know the fully detailed fields, unlike traditional approaches to synthesis and design optimization. Once the properties are refined in a top-down process until some $K^{th}$ level that is sufficiently detailed, the realization of the design can be addressed in multiple different ways in a postprocessing step. For instance, if a parameterized microstructure regime is of particular interest—e.g., Voronoi foams, k-NN foams, grain-and-germ textures, and so on—the multi-scale synthesis stops at a scale comparable to the microstructure feature size and calls an postprocessing algorithm to find a structure that realizes the given set of surrogate properties.

If one or more manufacturing processes are identified, a manufacturing process planner can be called to find an as-planned representation of the shape and material layout (e.g., a sequence of additive/subtractive manufacturing actions, G-code, etc.) that realizes the optimized set of surrogate properties. The realization of the designed properties as one or more shape and material layout(s) is postponed until available parameterized material microstructure or manufacturing process plans are specified.

A major benefit of the lazy approach is to circumnavigate the connectivity problem at the RVE boundaries, which is one of the major challenges that existing multi-scale methods have to face. When looking for a precise realization (e.g., by lattice structures), one has to ensure that the nonempty material phases properly connect at the boundaries of the cells to ensure structural integrity. This condition is often satisfied by restricting the design to materials that are assumed to bond well and disallowing voids altogether at the boundaries of cells. Our method does not have to deal with this problem throughout the costly optimization cycles. It rather keeps the options open by declarative representation of a maximal family of designs from which a subset of properly connecting microstructures may be found. If no such solution exists for a given microstructure parameterization or fabrication method, it will determined during post-processing.

One issue that may be seen using this method is that no tangible realization of the at-scale properties are observed (e.g., for visualization and user inspection) at the intermediate stages, which may be counterintuitive to the designer.

But this is not a true limitation, as one can visualize the family of designs that realize the discovered surrogate properties—up to the uncertainty of the undiscovered or truncated higher-order properties—by the simplest representative realization in the equivalence class. For instance, if only the $0^{th}$ order integral property (e.g., volume fraction) is known for the base materials in a given cell, it is visualized by using a uniform color along a spectrum of hues that suggest an uncertain distribution. Higher-order integral properties (e.g., high-frequency harmonics) can be visualized separately in a similar fashion but will provide less clues into what to expect of the realized structure.

For a given class of computational physics solvers (e.g., FEA, FVM, statistical physics solvers, etc.) a series of geometric surrogate properties are determined that provide an "informationally complete" account of shape and material layout for the analysis tool to perform its computations unambiguously. These surrogate properties depend on the class of numerical methods. However, surrogate properties can be physics-agnostic. For instance, the same proxy variables are common to structural stiffness, heat conduction, compressible fluid flow, and other BVP that can be solved by weak variational form.

In the example embodiments above, integrals of basis functions over the shape and their inner products with material properties were used as a concrete example of surrogate properties at-scale that can be used directly to perform a wide class of numerical analysis tools (namely, FEA) without knowing precise shape and material realization. However, this hierarchical top-down multi-scale design framework is not limited to integrals of basis functions or FEA discretization. There are other examples of properties that can be used with different numerical methods to solve the forward problem. This makes them good candidates for decision variables in the inverse problem provided that gradient-like quantities (e.g., sensitivities) can be reconciled. Other examples include harmonics, such that if each base material distribution is viewed as a 3D signal, its discrete Fourier transform (DFT) is obtained by inner products of the field with harmonic basis of various frequencies. Fourier expansion is commonly used to solve BVPs using separation of variables, and is a popular representation for periodic microstructure realization.

Other examples of forward solvers include multi-point correlations and Minkowski functionals. The multi-point correlation functions for one, two, or more points randomly selected within the cell provide higher-order statistical measures of the material distribution for each base material within the field. These measures have been used in characterizing and synthesizing microstructures. The Minkowski functionals are morphological descriptors of a domain that capture connectivity and geometric content of spatial patterns and are useful in quantifying them for statistical physics-based modeling. Minkowksi functionals are also popular as microstructure descriptors.

To manage the enormous complexity of design for high-resolution manufacturing with advanced materials, a single-scale approach to synthesis is computationally prohibitive. Moreover, different physical phenomena intrinsically require viewing the same object and measuring its properties at multiple size scales spanning several orders of magnitude in units of length.

Existing multi-scale approaches to design are limited by rather strict assumptions that narrow down the possibilities. These range from imposing a clean separation of scales by limiting the design to small microstructure unit cells (e.g., the "RVE hypothesis"), assuming simple parametrized structures with reduced constitutive behavior (e.g., iso-/ortho-tropic foams), assuming periodic building blocks with simple connections, and so forth. Many of them come with no guarantees when some of these assumptions are violated or used too permissively.

A method and system as described above can be configured to perform top-down hierarchical multi-scale design that enables designing a broader range of structures without making such assumptions. The key idea is to use a declarative approach to directly synthesize the at-scale properties, rather than their precise realization up to the finest level of detail. At every level of the hierarchy, a family of equivalent designs are represented by their common properties that are measured at that scale, postponing decisions on finer-grained details to the next level. Once the design family is restricted to a narrow enough subset that is unambiguous up to manufacturing tolerances, the realization problem can solved a posteriori (e.g., by manufacturing process planning). The key enabling technology is one's ability to analyze a given family of designs cumulatively using only their common properties at-scale. Our approach is to look inside different classes of numerical analysis tools and find out the sequence of integral properties that provide an informationally complete input for them to operate (e.g., most-significant harmonics for spectral analysis. These properties are used as decision variables in design optimization.

Figure 17:
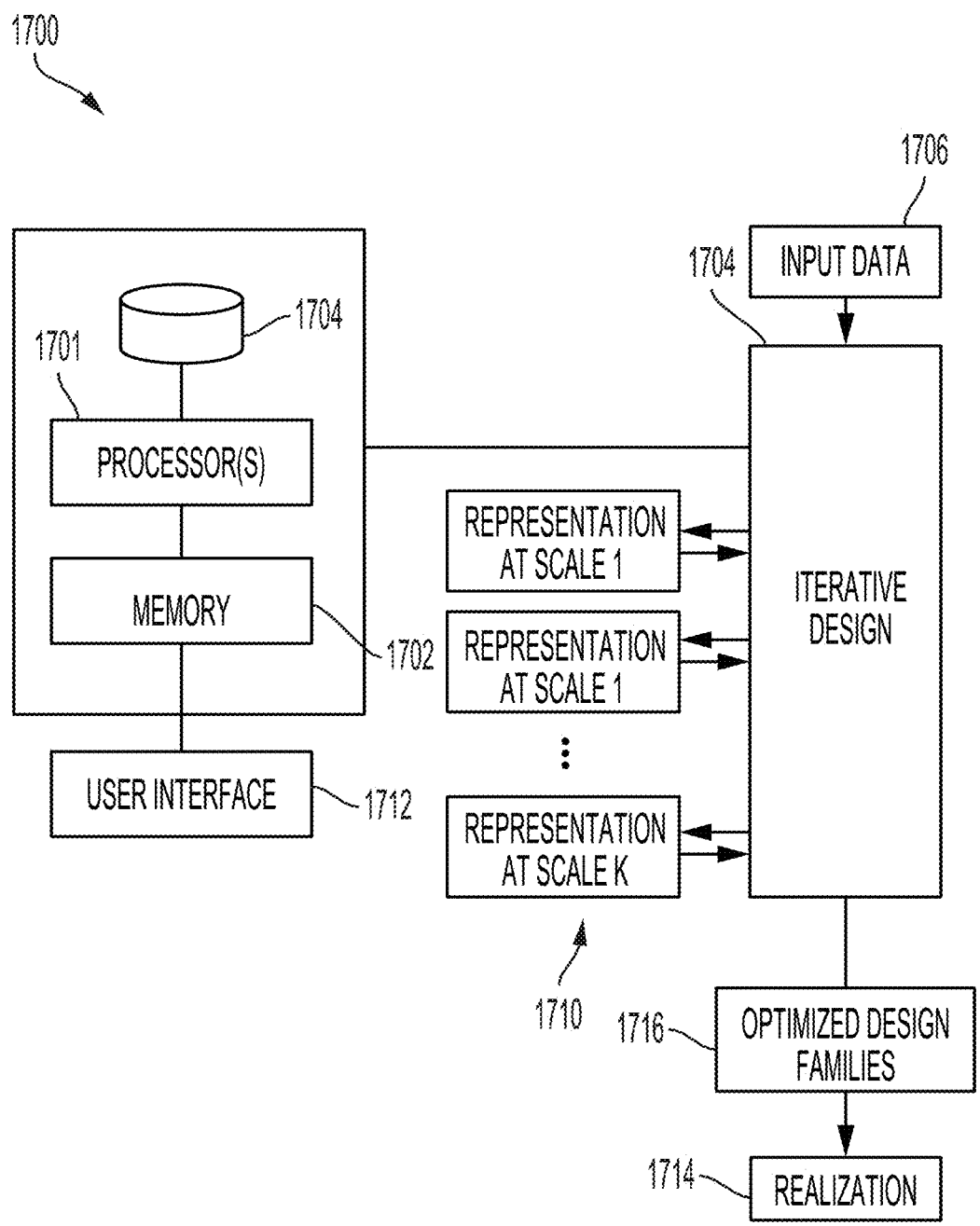
FIG. 17 is a block diagram of a system according to an example embodiment.

An example system utilizing these methods is shown in FIG. 17. The system 1700 includes one or more processors 1701, memory 1702 (e.g., random access memory) and persistent storage 1704 (e.g., disk drive, flash memory). These components 1701, 1702, 1704 are coupled by data transfer lines (e.g., memory busses, input/output busses) and are configured to perform functions indicated by one or more design modules 1706. The processor 1701 may include any combination of central processing units and graphical processing units. In this case, the system 1700 includes one or more functional modules 1705 having instructions that run on the processor 1701 and may be loaded from and stored to memory 1702, 1704.

The module 1705 receives input data 1706 that defines, e.g., a design domain/region in the space, design criteria such as specification of objective function(s) and constraint(s) at the top-level (e.g., the coarsest-grained scale), one or more initial designs, available base materials, IC/BC, and so on. The module 1704 carries a hierarchical representation of the designs discretized at each scale into a number of disjoint cells for the design representation, starting at the coarsest-grained detail. Each cell is assigned one or more surrogate properties of shape and material distribution that declaratively represent design families that collectively satisfy the top-level constraints.

For one or more levels in the hierarchical design representation, designs are refined iteratively in a top-down order. Beginning with the first-level cells at the coarsest-grained scale as parent cells, the module 1704 divides each of the parent cells into a plurality of child cells, the child cells of each parent cells each having child properties that collectively satisfy the one or more constraints imposed by the properties of the respective parent cells. The child properties within each of the child cells are optimized while still collectively satisfying the one or more properties of the respective parent cells. This may produce, for example, a plurality of consistent representations of designs at multiple scales 1710, which define increasingly more restricted families of feasible designs. Design families that satisfy the design criteria and have the best performance (e.g., determined via a forward solver used iteratively within the module 1704) can be used as the basis for the next iteration. The process is repeated in the next level of the hierarchical design representation (at a finer-grained scale) within one or more of the parent cells, by applying design criteria imposed partially by the input 1706 and partially by the constraints obtained from the designed properties at the previous level (parent cells) 1704.

The multi-scale design process is complete when a selected set of child cells represent designs that satisfy the top-level design criteria and is fine-grained enough for realization 1714. The surrogate properties obtained at the proper scale for a selected set of child cells are used to realize one or more shape and material layouts that satisfy them. The realization 1714 can take the form of computing parameters for microstructure synthesis in a specific regime (e.g, foams) or determining a manufacturing process plan to produce part(s) that satisfy surrogate properties. The design(s) 1716 may be in a format that is suitable to be used as an input to a microstructure synthesis module or manufacturing process planner, and thereby realize or produce the object 1714, e.g, via an additive manufacturing instrument.

In summary, a system is described for designing parts that have desired (e.g., optimized) surrogate properties while satisfying required constraints at a plurality of size scales with the aid of a digital computer. The computer may include a storage device storing parameters specifying a finite number ($K \geq 1$) of levels at different size scales (denoted by the $k^{th}$ scale for ($k=1, 2, \ldots, K$) at which the design will be represented and computed on for different requirements. In this example, $k_1=1$ corresponds to the coarsest scale (e.g., macro-scale) typically the one at which design requirements are specified, and $k_1$-$K$ corresponds to the finest (e.g., micro- or nano-scale) typically the one at which design is represented in full-detail. There may be 0, 1, or more scales in between (e.g., meso-scale). The computer may store parameters specifying limits (e.g., min/max) on the characteristic length of cells (defined below) at each size scale.

The computer may store a hierarchical representation of shape and material distribution as a spatial cellular decomposition of the underlying space in which the part is immersed. This could include multi-level voxelization—every voxel/cell at one level expands to another grid of smaller voxels at lower scale. The cell complexes may be of arbitrary shape (e.g., hex mesh, etc.). Each cell is assigned to a specific size scale and is further decomposed into smaller disjoint, mutually exclusive, cells at the finer size scale. The hierarchical representation may include geometry (size and shape information of cells) and topology (adjacency and incidence relations of cells with each other) at each size scale. The hierarchical representation may include parent/child relationships in the hierarchy that specify which cells at the $(k+1)^{th}$ (finer-grained scale) collectively unify into a cell at the $k^{th}$ scale (coarser-grained scale). The hierarchical parameters may include values of a finite list of design variables (called "surrogate" properties) assigned to the entirety of each cell to represent the measurable properties of a designed part's structure as seen by an observer at a given scale. The hierarchical representation may further include values of a finite list of dependent at-scale physical properties assigned to the entirety of each cell.

The computer is further configured to store specifications of the intended geometric and physical relationships across the scales, to specify invariance relations that must hold between the design variables assigned to parent/child cells of consecutive levels in the hierarchy (e.g., additivity of integral properties); and constraints on shape and material distribution to be enforced on all cells in individual scales or across cells in a range of scales, including equality and inequality constraints on functions of the surrogate properties (e.g., continuity or differentiability of design variables).

The computer is further configured to store parameters defining the semantics for interchangeability of the part's representation at different scales to qualify invariance in the presence of errors/noise, including: tolerance specifications on cell geometry (e.g., GD&T or its equivalent); and allowable variations/error margins for design variables and for resulting properties (e.g., material and physical fields).

The computer further has a processor and memory within which code for execution by the processor is stored to perform a cell size validity test. This test involves checking if the size of the cells at each scale is within the specified limits and flag the ones that require to be resized. The processor performs a consistency test across the scales. This involves iterating over all cells over all scales and testing if the invariance relations between parent/child cells (with given design variables) hold across the scales with respect to interchangeability criteria—e.g., for additive properties, check if the sum of variables at all child cells is equal (up to specified tolerance for errors/noise) with the corresponding variable at their parent cell.

The processor can further perform constraint validation across the scales. This involves iterating over different cells over various scales and testing if the specified constraints over one scale or across multiple scales (with given design variables) hold with respect to interchangeability criteria. For example, for continuity, the cells are checked to determine if they are smaller than a length-threshold carry integral properties smaller than a value-threshold as prescribed by allowable variations.

The processor can further perform bottom-up evaluation (forward problem). Starting from the known design variables at the $K^{th}$ scale (the finest-grained scale), the design variables at the $k^{th}$ scale (coarser-grained scale) are iteratively evaluated by applying specified invariance laws to the design variables at the $(k+1)^{th}$ scale (next finer scale) until it reaches the 0-th scale (i.e., the coarsest-grained scale)—e.g., for additive properties, compute the summation of the variables at all child cells to obtain the corresponding variable at their parent cell.

In some embodiments, the storage device further stores a specification of performance requirements and objectives at a plurality of size scales, including parameters to specify design/fitness criteria, cost/objective functions, available resources, and other structural, behavioral, or functional requirements to be optimized (e.g., minimized, maximized, or traded off in multi-objective scenarios). The device can also store constraints on physical properties to be enforced on all cells in individual scales or across cells in a range of scales, including equality and inequality constraints on functions of said properties (e.g., continuity of a property with respect to a variable). These constraints include the weak form of initial/boundary value problem specification for single- or multi-physics simulation including: IC/BC or their combinations distributed over boundary cells at a given scale; physical governing equations in the form of discretized ordinary/partial differential equations (turned into algebraic forms); composed of single- or multi-physical conservation (e.g., balance and equilibrium) laws, phenomenological (e.g., constitutive) laws, energy conversion relations, and defining equations; and empirical relations that map the design variables into intermediate properties that are needed to compute the physical properties needed to solve the above.

In such a case, the processor can further perform forward problem solving (e.g., physical analysis). For example, an FEA solver can be called at any the relevant size scale(s) to compute the physical response and evaluate performance criteria such as objective function(s), violation of (or lack thereof) constraint(s) (e.g., penalty function(s)), and gradient-like quantities (e.g., sensitivities) of the objective/penalty function(s) to changes in decision variables. The solver can evaluate whether the specified set of objective functions are locally optimal (or Pareto-optimal for multi-objective cases which involves enumerating solutions along Pareto front) and whether the specified set of behavioral constraints are satisfied at a given size scale. The solver can evaluate the proposed change(s) to the design variables at a given size scale to move closer to an optimized state with satisfied constraints.

In some embodiments, the data storage further stores a specification of manufacturing requirements and objectives at a plurality of size scales, including parameters to specify design/fitness criteria, cost/objective functions, available resources, and other structural, behavioral, or functional requirements to be optimized (e.g., minimize, maximized, or traded off in multi-objective scenarios). The device may further store constraints on process properties to be enforced on all cells in individual scales or across cells in a range of scales, including equality and inequality constraints on functions of said properties (e.g., continuity of a property with respect to a variable). These constraints include, but are not limited to various fabrication process/capability specifications for additive, subtractive, and/or hybrid (e.g., combined additive and subtractive) manufacturing simulation including: conditions on geometric and material distribution such as the minimum manufacturable neighborhood (e.g., tool insert in subtractive processes and molten filament shape in 3D printing), avoiding large overhang angles for support-free 3D printing, proper draw/parting angles for casting/molding, existence of passages to empty the powder in power-based additive processes, and other process-specific constraints; conditions on the machine degrees of freedom (e.g., combinations of translations and rotations); and constraints drawn from experimental observation of process-specific material structure such as microstructure shape/composition in metal additive manufacturing, relationship between temperature history and structural properties, and so on.

The processor further may further perform forward problem solving (analysis). This may involve calling a manufacturability analysis solver at the relevant size scale(s) to evaluate performance criteria such as objective function(s), violation of (or lack thereof) constraint(s) (e.g., penalty function(s)), and gradient-like quantities (e.g., sensitivities) of the objective/penalty function(s) to changes in decision variables. The solver may determine whether the specified set of objective functions are locally optimal (or Pareto-optimal for multi-objective cases) and whether the specified set of manufacturability constraints are satisfied at a given size scale. The solver may determine whether the proposed change(s) to the design variables at a given size scale to move closer to an optimized state with satisfied constraints.

In some embodiments, the storage device further includes specification of optimization parameters including but not limited to termination criteria, penalty factors, etc. In such a case, the processor may further perform inverse problem solving (synthesis). This involves calling an optimizer (e.g., gradient-based or stochastic) at any the relevant size scale(s) to iteratively call the performance analysis solver. The inverse problem solving further involves applying the proposed change(s) to the design variables at a given size scale to move closer to an optimized state with satisfied constraints.

The processor may be further configured to pass the optimal results at the $k^{th}$ scale to initialize the decision variables and specify the constraints they impose on the decision variables at the $(k+1)^{th}$ scale, and repeat the optimization at the finer-grained scale. The processor may then call a post-processor to realize the optimized properties by determining at least one the following: parameterized microstructures at a given scale using either pre-determined relationship between parameters and desired properties, or using optimization to match them (e.g., in a weighted least-squares sense); and manufacturing process plans such as a sequence of additive/subtractive actions, G-code, etc. whose as-manufactured outcome satisfies the desired properties.

In some embodiments, the storage device further stores a specification of optimization parameters including but not limited to termination criteria, penalty factors, etc. In such a case, the processor may further perform inverse problem solving (synthesis). The inverse problem solving involves calling an optimizer (e.g., gradient-based or stochastic) at any the relevant size scale(s) to iteratively call the manufacturability analysis solver described above; and apply the proposed change(s) to the design variables at a given size scale to move closer to an optimized state with satisfied constraints. The processor passes the optimal results at the $k^{th}$ scale to initialize the decision variables and specify the constraints they imposed on the decision variables at the $(k+1)^{th}$ scale, and repeat the optimization at the finer scale. The processor then calls a post-processor to realize the optimized properties by determining at least of the following: parameterized microstructures at a given scale using either pre-determined relationship between parameters and desired properties, or using optimization to match them (e.g., in a weighted least-squares sense); and manufacturing process plans such as a sequence of additive/subtractive actions, G-code, etc. whose as-manufactured outcome satisfies the desired properties.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

For a given class of computational physics solvers (e.g., FEA, FVM, statistical physics solvers, etc.) a series of geometric surrogate properties are determined that provide an "informationally complete" account of shape and material layout for the analysis tool to perform its computations unambiguously. These surrogate properties depend on the class of numerical methods, discretization schemes, and the basis functions used to project the infinite-dimensional space of shape and material distribution fields into a finite-dimensional subspace for digital computability. However, surrogate properties can be physics-agnostic. For instance, the same proxy variables are common to structural stiffness, heat conduction, compressible fluid flow, and other BVP that can be solved by weak/variational form.

The invention claimed is:

1. A computer-implemented method comprising:
specifying at least one design criterion comprising at least one constraint;
constructing a hierarchical representation of families of designs that satisfy the at least one design criterion at every level of the hierarchical representation, each family comprising an equivalence class of shape and material distribution fields, the hierarchical representation comprising lower levels of representation that provide more details about the families of designs than higher levels of representation, the lower levels of representation further restricting the families of designs compared to the higher levels of representation;
synthesizing the families of designs at every level of the hierarchical representation that satisfy the specified criteria as well as additional constraints that link the levels of the hierarchical representation, wherein synthesizing the families of designs comprises invoking a forward solver to evaluate objective functions and constraint violations at each level of the representation;
determining a lowest level of representation of the hierarchical representation that produces a final design at a detail suitable for manufacturing; and
manufacturing a part according to the final design via a manufacturing instrument.

2. The method of claim 1, wherein the design criteria further comprise at least one objective function that provides a figure of merit for designs that satisfy the at least one constraint and the additional constraints, the synthesizing the families of designs further comprising optimization with respect to the objective function.

3. The method of claim 1, wherein the hierarchical representation comprises of surrogate properties of shape and material distributions for the families of designs, the surrogate properties providing sufficient information to evaluate the families of designs against the design criteria.

4. The method of claim 3, wherein the surrogate properties comprise finite subsequences of a convergent sequence or a series of variables that represent a projection of the shape and material distributions at a given level onto a functional basis.

5. The method of claim 4, wherein longer subsequences are decided at the lower levels of representation.

6. The method of claim 3, wherein each level of the hierarchical representation comprises a spatial cellular decomposition wherein each cell at each level of the spatial cellular decomposition is assigned with one or more surrogate properties.

7. The method of claim 6, wherein each cell at each level is decomposed into disjoint cells to obtain next cells at a next lower level.

8. The method of claim 6, wherein each level of the hierarchical representation describes the shape and the material distributions at a size scale determined by a size of each cell.

9. The method of claim 6, wherein the additional constraints link the properties of a cell at a given level to properties of the cells obtained from the decomposition.

10. The method of claim 9, wherein the surrogate properties are integral properties of the shape and material distributions within each cell and the additional constraints that link them across the levels are of additivity of the integral properties.

11. The method of claim 3, wherein final shape and material distributions are not determined until the surrogate properties are synthesized for all levels of representation.

12. A system comprising:
a processor coupled to memory, the memory storing instructions executable by the processor for performing:
synthesizing a hierarchical representation of surrogate properties of shape and material distributions of a family of designs by a spatial cellular decomposition with the surrogate properties assigned to each cell at each level of the hierarchical representation, each family comprising an equivalence class of shape and material distribution fields;
starting from a top level of the hierarchical representation, determining the surrogate properties at the top level that satisfy constraints specified at the top level based on an analysis performed at the top level;
for each level below the top level, performing a process comprising further decomposing each cell at a given level into disjoint child cells of a next level, decisions on the surrogate properties assigned to the disjoint child cells being made based on an analysis performed at the given level subject to additional constraints that enforce the properties at each cell at the given level to remain consistent with the surrogate properties decided at each cell at a previous level, wherein the analysis comprises invoking a forward solver to evaluate objective functions and constraint violations at the given level; and
determining a lowest level of representation of the hierarchical representation that produces a final design at a detail suitable for manufacturing; and
a manufacturing instrument that builds a part according to the final design.

13. The system of claim 12, wherein the surrogate properties synthesized at each level declaratively represent a family or equivalence class of designs that possess the surrogate properties, and wherein the decisions at each level further restrict the class of designs into subclasses by redistributing the properties of a cell in the previous level.

14. The system of claim 12, wherein the process terminates when the family or the equivalence class of designs is restricted enough at a bottom level of the representation to be interpreted as a class of interchangeable designs realized by at least one of given manufacturing processes and material microstructures.

15. The system of claim 14, wherein the given manufacturing process or material microstructure is finalized after the synthesis of the surrogate properties is complete at all levels.

16. The system of claim 12, wherein the processor further optimizes the surrogate properties at one or more of the levels according to one or more objective functions.

17. The system of claim 16, wherein the optimization comprises enumerating solutions along Pareto fronts.

18. The system of claim 12, wherein the decisions at each level are performed by iterations over one or more candidate families of designs represented by the surrogate properties at the given level.

19. The system of claim 18, wherein the iterations are guided by sensitivities or gradients of at least one of the constraints or objective functions at the given level to changes in the surrogate properties.

20. A method comprising:

visualizing a hierarchical representation of surrogate properties of shape and material distributions of a family of designs by a spatial cellular decomposition with properties assigned to each cell at each level of the hierarchical representation, each family comprising an equivalence class of shape and material distribution fields, and wherein the surrogate properties are determined by invoking a forward solver to evaluate objective functions and constraint violations at each level;

displaying a color-coding of values of surrogate properties at specified levels of the representation;

determining a lowest level of representation of the hierarchical representation that produces a final design at a detail suitable for manufacturing; and manufacturing a part according to the final design via a manufacturing instrument.

* * * * *